United States Patent
Kalakrishnan et al.

(10) Patent No.: US 12,083,678 B2
(45) Date of Patent: Sep. 10, 2024

(54) EFFICIENT ADAPTION OF ROBOT CONTROL POLICY FOR NEW TASK USING META-LEARNING BASED ON META-IMITATION LEARNING AND META-REINFORCEMENT LEARNING

(71) Applicant: Google LLC, Mountain View, CA (US)

(72) Inventors: Mrinal Kalakrishnan, Mountain View, CA (US); Yunfei Bai, Fremont, CA (US); Paul Wohlhart, Sunnyvale, CA (US); Eric Jang, Cupertino, CA (US); Chelsea Finn, Berkeley, CA (US); Seyed Mohammad Khansari Zadeh, San Carlos, CA (US); Sergey Levine, Berkeley, CA (US); Allan Zhou, Mountain View, CA (US); Alexander Herzog, San Jose, CA (US); Daniel Kappler, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 360 days.

(21) Appl. No.: 17/422,260

(22) PCT Filed: Jan. 23, 2020

(86) PCT No.: PCT/US2020/014848
§ 371 (c)(1),
(2) Date: Jul. 12, 2021

(87) PCT Pub. No.: WO2020/154542
PCT Pub. Date: Jul. 30, 2020

(65) Prior Publication Data
US 2022/0105624 A1    Apr. 7, 2022

Related U.S. Application Data

(60) Provisional application No. 62/796,036, filed on Jan. 23, 2019.

(51) Int. Cl.
*B25J 9/16*    (2006.01)

(52) U.S. Cl.
CPC ..... *B25J 9/163* (2013.01); *G05B 2219/40116* (2013.01); *G05B 2219/40499* (2013.01)

(58) Field of Classification Search
CPC . B25J 9/163; B25J 9/1664; B25J 9/162; B25J 9/1689; B25J 13/089;
(Continued)

(56) References Cited

U.S. PATENT DOCUMENTS

| | | | |
|---|---|---|---|
| 11,524,401 B1 * | 12/2022 | Zhang | G06N 3/008 |
| 2015/0336268 A1 * | 11/2015 | Payton | G05B 19/423 |

(Continued)

FOREIGN PATENT DOCUMENTS

| | | |
|---|---|---|
| CN | 102819264 | 12/2012 |
| CN | 107020636 | 8/2017 |
| CN | 108415254 | 8/2018 |

OTHER PUBLICATIONS

China National Intellectual Property Admininstration; Notification of First Office Action issued in Application No. 202080010185.8; 25 pages; dated Jul. 14, 2023.

(Continued)

*Primary Examiner* — Elaine Gort
*Assistant Examiner* — Ellis B. Ramirez
(74) *Attorney, Agent, or Firm* — Gray Ice Higdon

(57) ABSTRACT

Techniques are disclosed that enable training a meta-learning model, for use in causing a robot to perform a task, using imitation learning as well as reinforcement learning. Some implementations relate to training the meta-learning model using imitation learning based on one or more human guided demonstrations of the task. Additional or alternative implementations relate to training the meta-learning model using reinforcement learning based on trials of the robot attempt-
(Continued)

ing to perform the task. Further implementations relate to using the trained meta-learning model to few shot (or one shot) learn a new task based on a human guided demonstration of the new task.

14 Claims, 12 Drawing Sheets

(58) Field of Classification Search
CPC ........... G05B 2219/40116; G05B 2219/40499; G06N 3/006; G06N 3/08; G06N 3/045; G06N 7/01; G06N 3/0895; G06N 3/09; G06N 3/091; G06N 3/092; G06N 3/094; G06N 3/096; G06N 3/098; G06N 3/0985; G05D 1/02
USPC .............................. 700/246; 706/12, 16, 52
See application file for complete search history.

(56) References Cited

U.S. PATENT DOCUMENTS

| | | | |
|---|---|---|---|
| 2017/0028551 A1* | 2/2017 | Hemken | B25J 9/163 |
| 2018/0089589 A1* | 3/2018 | Ooba | G05B 19/4182 |
| 2018/0157973 A1 | 6/2018 | El-Yaniv et al. | |
| 2018/0197083 A1* | 7/2018 | Dasgupta | G06N 3/006 |
| 2018/0222045 A1* | 8/2018 | Khansari Zadeh | G06V 20/10 |
| 2018/0357552 A1* | 12/2018 | Campos | G06N 5/043 |
| 2019/0232488 A1* | 8/2019 | Levine | G05B 19/042 |
| 2019/0275671 A1* | 9/2019 | Natarajan | B25J 9/1664 |
| 2019/0321974 A1* | 10/2019 | Leon | B25J 9/1687 |
| 2020/0166896 A1* | 5/2020 | Clune | G06N 3/006 |
| 2022/0147876 A1* | 5/2022 | Dalli | G06N 20/00 |

OTHER PUBLICATIONS

Kralev, R. et al.; "Learning to Reinforcement Learn by Imitation;" retrieved from internet: URL:https://openreview.net/pdf?id=HJG1Uo09Fm; 13 pages; Sep. 28, 2018.
Yu, T. et al; "One-Shot Imitation from Observing Humans via Domain-Adaptive Meta-Learning;" arXiv.org; arXiv:1802:01557v1; 12 pages; Feb. 5, 2018.
Erbas, M. et al.; "Towards Imitation-Enhanced Reinforcement Learning in Multi-Agent Systems;" 2011 IEEE Symposium on Artificial Life (ALIFE); 8 pages; Apr. 11, 2011.
European Patent Office; International Search Report and Written Opinion of PCT application Ser. No. PCT/US2020/014848; 13 pages; dated May 12, 2020.
Duan et al., "RL2: Fast Reinforcement Learning Via Slow Reinforcement Learning" arXiv:1611.02779v2 [cs.AI] dated Nov. 10, 2016. 14 pages.
Finn, C. et al. "Model-Agnostic Meta-Learning for Fast Adaptation of Deep Networks;" In Proceedings of the 34th International Conference on Machine Learning; vol. 70; 1126-1135; JMLR.org; 10 pages; 2017.
Gu, S. et al., "Continuous Deep Q-learning with Model-Based Acceleration;" In Proceedings of International Conference on Machine Learning; 10 pages; 2016.
Kormushev, P., (Oct. 2010). "Robot Motor Skill Coordination With EM-Based Reinforcement Learning." In Intelligent Robots and Systems (IROS), IEEE/RSJ International Conference on (pp. 3232-3237).
Silver, D., et al.; Mastering the Game of Go with Deep Neural Networks and Tree Search; Nature; 20 Pages; dated 2016.
Duan, Y. et al.; "One-Shot Imitation Learning;" xrXiv.org; arXiv:1703.07326v1; 23 pages; Mar. 21, 2017.
Bengio, S. et al., "On the Optimization of a Synaptic Learning Rule;" In Optimality in Artificial and Biological Neural Networks, 29 pages, 1992.

Brys, T. et al., "Reinforcement Learning from Demonstration through Shaping;" in Proceedings of 24th International Conference on Artificial Intelligence (IJCAI); 7 pages; 2015.
Finn, C. et al., "One-Shot Visual Imitation Learning Via Meta-Learning;" Conference on Robot Learning (CoRL); 12 pages; 2017.
Gupta, A. et al., "Meta-Reinforcement Learning of Structured Exploration Strategies;" arXiv preprint arXiv:1802.07245; 11 pages; Feb. 20, 2018.
Hausman, K. et al., "Multi-Modal Imitation Learning from Unstructured Demonstrations using Generative Adversarial Nets;" In Neural Information Processing Systems (NIPS); 11 pages; 2017.
Hester, T. et al., "Deep Q-Learning from Demonstrations;" The Thirty-Second AAAI Conference on Artificial Intelligence (AAAI-18), 8 pages; 2018.
Hochreiter, S. et al., "Learning to Learn Using Gradient Descent;" International Conference on Artificial Neural Networks (ICANN); 8 pages; 2001.
Houthooft, R. et al., "Evolved Policy Gradients;" arXiv.org; arXiv:1802.04821; 18 pages; Apr. 29, 2018.
James, S. et al., "Task-Embedded Control Networks for Few-Shot Imitation Learning;" arXiv preprint arXiv:1810.03237; 13 pages; Oct. 8, 2018.
Kober, J. et al., "Policy Search for Motor Primitives in Robotics;" In Neural Information Processing Systems (NIPS); 8 pages; 2009.
Kober, J. et al., "Reinforcement Learning in Robotics: A Survey;" The International Journal of Robotics Research; 37 pages; 2013.
Langley, P.; "Crafting Papers on Machine Learning;" Proceedings of the 17th International Conference on Machine Learning (ICML 2000); 6 pages; Jun. 2000.
Mishra, N. et al., "A Simple Neural Attentive Meta-Learner;" International Conference on Learning Representations (ICLR); 17 pages; 2018.
Nagabandi, A. et al., "Learning to Adapt in Dynamic, Real-World Environments through Meta-Reinforcement Learning;" International Conference on Learning Representations (ICLR); 17 pages; 2019.
Nair, A. et al., "Overcoming Exploration in Reinforcement Learning with Demonstrations;" International Conference on Robotics and Automation (ICRA); 8 pages; May 2018.
Paine, T. L. et al., "One-Shot High-Fidelity Imitation: Training Large-Scale Deep Nets with RL;" arXiv preprint arXiv:1810.05017; 17 pages; Oct. 11, 2018.
Peters, J. et al., "Policy Gradient Methods for Robotics;" In International Conference on Intelligent Robots and Systems (IROS); 7 pages; Oct. 2006.
Rajeswaran, A. et al., "Learning Complex Dexterous Manipulation with Deep Reinforcement Learning and Demonstrations;" Robotics: Science and Systems; 9 pages; 2018.
Sæmundsson, S. et al., "Meta Reinforcement Learning with Latent Variable Gaussian Processes;" arXiv preprint arXiv:1803.07551; 11 pages; Jul. 7, 2018.
Schmidhuber, J., "Evolutionary Principles in Self-Referential Learning;" PhD thesis, Technische Universitat Munchen, Germany; 64 pages; May 14, 1987.
Stadie, B. C. et al., "Some Considerations on Learning to Explore via Meta-Reinforcement Learning;" arXiv preprint arXiv:1803.01118; 10 pages; Mar. 3, 2018.
Subramanian, K. et al., "Exploration from Demonstration for Interactive Reinforcement Learning;" In International Conference on Autonomous Agents & Multiagent Systems; 10 pages; 2016.
Sun, W. et al., "Truncated Horizon Policy Search: Combining Reinforcement Learning & Imitation Learning;" International Conference on Learning Representations (ICLR); 14 pages; 2018.
Sung, F. et al., Learning to Learn: Meta-Critic Networks for Sample Efficient Learning; arXiv.org; arXiv:1706.09529; 12 pages; Jun. 29, 2017.
Taylor, M. E. et al., Integrating Reinforcement Learning with Human Demonstrations of Varying Ability; In International Conference on Autonomous Agents and Multiagent Systems; 8 pages; May 2011.
Wang, J. X. et al., "Learning to Reinforcement Learn;" arXiv.org; arXiv:1611.05763; 17 pages; Nov. 24, 2016.

(56) References Cited

OTHER PUBLICATIONS

European Patent Office; Communication pursuant to Article 94(3) EPC issued in Application No. 20708314.8; 6 pages; dated Jan. 22, 2024.
China National Intellectual Property Admininstration; Notification of Second Office Action issued in Application No. 202080010185.8; 6 pages; dated May 24, 2024.

* cited by examiner

EFFICIENT ADAPTION OF ROBOT CONTROL POLICY FOR NEW TASK USING META-LEARNING BASED ON META-IMITATION LEARNING AND META-REINFORCEMENT LEARNING

BACKGROUND

Many robots are programmed to utilize one or more end effectors to grasp one or more objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

Techniques disclosed herein are directed towards training a robot agent using meta-learning such that the agent can learn to perform a new task based on a few demonstrations of the task (e.g., a single demonstration, two demonstrations, less than 5 demonstrations, less than 10 demonstrations, etc.) and a few trial and error attempts of performing the task (e.g., a single trial attempt, two trial attempts, less than five trial attempts, less than 10 trial attempts, etc.). Techniques disclosed herein are additionally directed towards utilizing such a robot agent in performing a new task. Meta-learning enables a robot agent to learn how to learn new tasks. A meta-learning model of the robot agent can initially be trained using a meta-training process to learn how to learn using training tasks. The trained meta-learning model can subsequently learn new tasks through a meta-test process based on a few demonstrations of the new task and a few trial and error attempts by the agent of performing the task.

In some implementations, the meta-learning model can include a trial policy used to gather information about a new task through imitation learning. One or more demonstrations of the new task can be used to generate the trial policy for the new task. This trial policy can then be used to generate one or more trial and error attempts of preforming the task. In some implementations, the trial policy can be used to constrain potential actions made by the agent when attempting to perform the task in the trial and error attempts. Additionally or alternatively, the meta-learning model can include an adapted trial policy which can be used to extract and integrate information from the trial(s) with the demonstration(s) to learn how to perform the new task. The adapted trial policy can be trained using reinforcement learning.

In some implementations, the trial policy and the adapted trial policy can be integrated into a model with shared parameters, where the trial policy and the adapted trial policy are trained simultaneously. For example, the meta-learning model can learn, using imitation learning, the trial policy for the new task by processing the demonstration of the new task. This trial policy for the new task can be used to shape the actions taken by the agent when learning to perform the task through trial and error reinforcement learning. One or more trials of the robot attempting to perform the new task can be generated using the trial policy for the new task. The one or more trials can be used to train the adapted policy using reinforcement learning to perform the new task.

Since the trial policy and the adapted trial policy share parameters, training the adapted policy via reinforcement learning will also update one or more portions of the trial policy. This updated trial policy can then be used to generate additional trial(s) of the new task, which in turn can be used to further train the adapted policy network. In other words, trials for the new task may be continuously generated based on the current trial policy parameters when training the meta-learning model.

In some implementations, the meta-learning model can be trained using Q-learning. Q-learning learns a policy network which can be used to determine what action for an agent (e.g., a robot) to take under what circumstances (e.g., based on current robot state data and/or current environmental state data). In some implementations, tasks can be represented using a finite Markov decision process. Q-learning can be used to find the optimal policy which maximizes the expected value of a reward over successive steps starting from the current state for the finite Markov decision process. In other words, Q-learning can be used to find the optimal policy to perform a new task.

In some implementations, off-policy task demonstrations (e.g., demonstration(s) of a new task, where the meta-learning model has not been trained to perform the new task) can be leveraged in the meta-training process using actor-critic reinforcement learning techniques. Normalized advantage functions can provide a way to represent and optimize both the actor and the critic with a single computation graph and/or objective. Normalized advantage functions can decompose the Q-function into a value function and a quadratic advantage function. In some implementations, this Q-function can be learned through a variety of Q-learning techniques, such as by minimizing the Bellman error. In some implementations, the trial policy and adapted trial policy of the meta-learning model can be trained using normalized advantage functions representation of Q-learning functions.

Additionally or alternatively, in some implementations, the meta-learning model can be trained such that the trial policy is decoupled and separately optimized form the adapted trial policy. In some of those implementations, the trial policy can be trained, using imitation learning, based on demonstration(s) of the agent performing a new task. The trial policy can then be frozen and used to generate trial and error attempts of performing the new task. The adapted trial policy can then be trained, to perform the new task, using reinforcement learning, and the trial and error attempts.

In some implementations, the demonstration(s) of a robot performing a task can include human guided demonstration(s), where a human demonstrates a task while controlling the robot. For example, a demonstration can be a human guided demonstration via a virtual reality interface in which the human demonstrates a robotic task (through interaction in the virtual reality interface) without directly contacting a corresponding robot. As another example, a demonstration can be a human guided demonstration that is a kinesthetic demonstration where the human physical contacts and guides the robot to demonstrate the robotic task. Additionally or alternatively, a human can provide the reward signals used when training the meta-learning model via reinforcement learning. For example, a human can provide a binary reward indicating whether the robot was successful in preforming a task in a trial and error attempt. For instance, the human can provide a reward (e.g., binary reward) via spoken user interface input (e.g., "correct", or "incorrect" or via touch user interface input (e.g., selecting a "thumbs up" or "thumbs down")."

In some implementations, the meta-learning model can be trained with a few human guided demonstrations (e.g., fewer than 10 human guided demonstrations, fewer than 100 human guided demonstrations, fewer than 500 human guided demonstrations, fewer than 1000 human guided demonstrations, etc.). The few human guided demonstrations can be used to autonomously generate additional training demonstration(s) without the need for an observer indicating whether the additional training demonstration(s) successfully complete the task. For example, the meta-learning model can include an embedding network portion and a control network portion, where the embedding network and the control network are jointly trained with the same meta-policy.

The embedding network can be trained, using pairs of demonstrations for the same task, to generate a task embedding which embeds each demonstration in a task space (i.e., a latent space of robot tasks). The control network can be trained to perform a task when conditioned on a task embedding. In some implementations, the control network can be used to autonomously generate, based on a task embedding of a human guided demonstration, a trial of the robot performing the task (also referred to here in a rollout). A task embedding of the rollout can be compared with the task embedding of the corresponding human demonstration to determine whether the robot is performing the same task (e.g., completes the task) in the rollout. For example, the task space can be generated such that the distance between demonstrations of the same task are small while distances between demonstrations of different tasks are large. In other words, the distance between the rollout embedding and the human guided demonstration embedding can be small when the robot is completing the same task (and conversely the distance can be large when the robot is not completing the same task).

If a system determines that the human guided demonstration—rollout pair is the same task, based on the distance between the task embeddings, the human guided demonstration-rollout pair can be stored as an additional training data. This additional training data can be used to train the meta-policy network, thus the meta-policy network can be trained using autonomously generated training data without the need for a human provided reward signal. In other words, the meta-policy network can be conditioned on a few human guided demonstration pairs. The meta-policy, conditioned on the few human guided demonstration pairs, can be used to autonomously generate additional human guided demonstration-rollout pairs. These additional human guided demonstration-rollout pairs can then be used to train the meta-policy.

Additionally or alternatively, the rollouts can be stored in a rollout database. Task embeddings for the rollouts can be compared to determine whether any pairs of the rollouts correspond to the same task. In other words, the distance between task embeddings of rollouts can determine whether pairs of rollouts correspond to the same task. Rollout-rollout pairs corresponding to the same task can be used to trial the meta-policy.

Accordingly, various implementations set for techniques for training a meta-learning model to few shot learn (or single shot learn) a new task using meta-imitation learning and meta-reinforcement learning. Conventional meta-learning techniques are unable to leverage both human guided demonstrations and trial and error attempts when learning to perform a new task. In contrast, techniques described herein can utilize both demonstrations and trial and error attempts, thus enabling the meta-learning model to be trained with smaller amounts of training data (e.g., training the model using a single human guided demonstration, training the model using less than five human guided demonstrations, etc.). Training the meta-learning model with only a few human guided demonstrations can save computing resources (e.g., processor cycles, memory, battery power, etc.) by reducing the amount of training data (i.e., the human guided demonstrations) which needs to be captured and provided to the system. Additionally or alternatively, computing resources are conserved when training the meta-learning model by reducing the number of training episodes necessary to train the model to perform the task.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
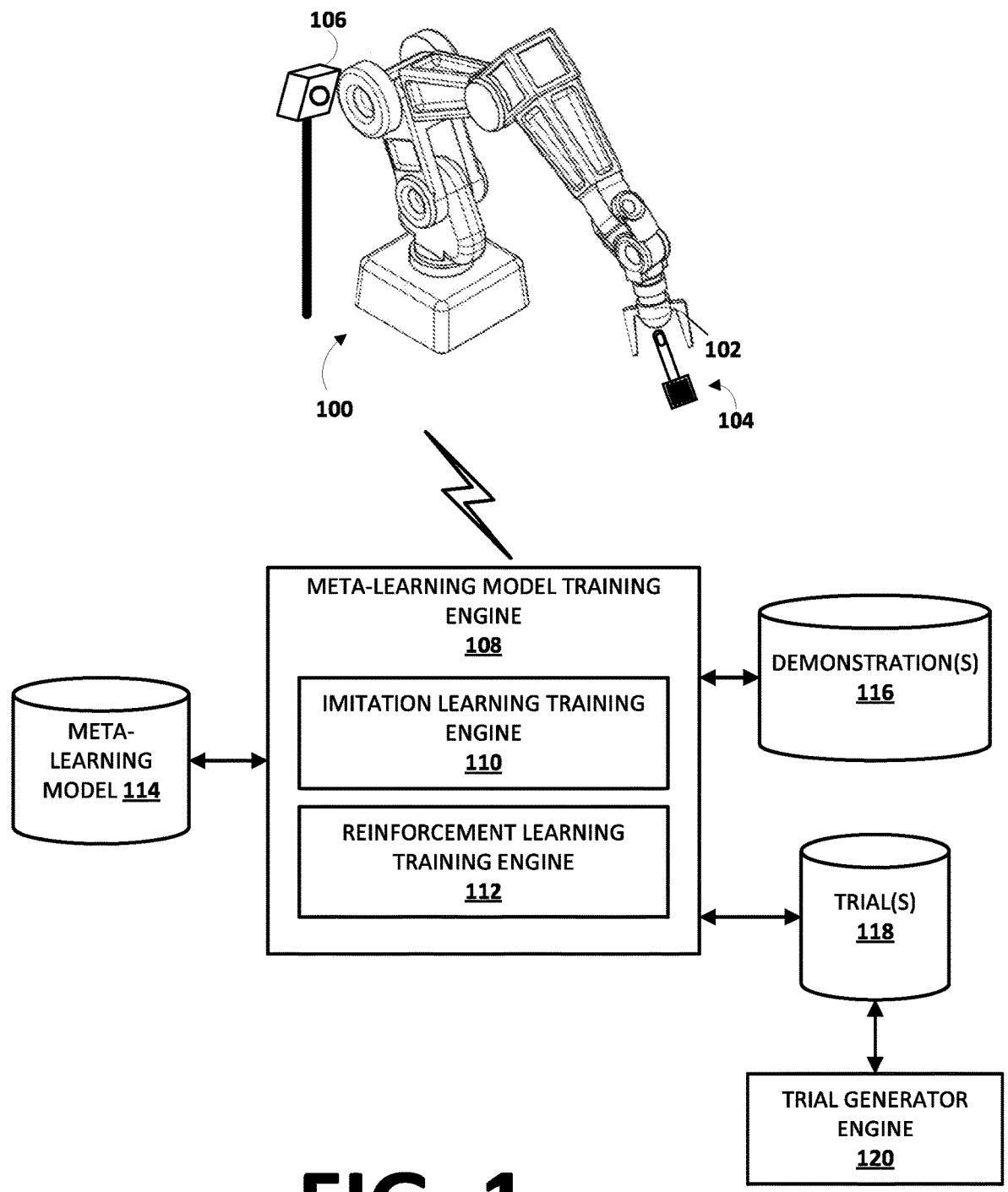
FIG. 1 illustrates an example environment in which implementations described herein may be implemented.

Imitation learning can allow robot agents to learn complex behaviors from demonstrations. However, learning a vision-based task, for instance, may require an impractical number of demonstrations. Meta-imitation learning is an approach directed towards enabling robot agents to learn a new task from one or a few demonstrations by leveraging previous data. However, a few demonstrations may not provide sufficient information to successfully infer a policy without actually trying the task. Techniques described herein provide a method that can "learn to learn" from both demonstrations and trial-and-error experience with sparse reward feedback. In comparison to meta-imitation learning, techniques described herein enable the robot agent to improve itself autonomously beyond demonstration data. In comparison to meta-reinforcement learning, techniques described herein can scale to a substantially broader distributions of tasks, as the demonstration reduces the burden of exploration.

Imitation learning enables robot agents to learn complex behaviors from demonstrations, which can be easy and/or intuitive for users to provide. However, learning expressive neural network policies from imitation requires a large number of demonstrations, particularly when operating on high-dimensional inputs such as image pixels. Meta-imitation learning has emerged as a promising approach for allowing a robot agent to leverage data from previous tasks in order to learn a new task from only a handful of demonstrations. However, in many practical few-shot imitation settings, there is an identifiability problem: it may not be possible to precisely determine a policy from one, or a few demonstrations, without actually trying the task. For example, it may be difficult to discern, from one demonstration, where to grasp an object when it is in a new position and/or how much force to apply in order to slide an object without knocking it over. In essence, a demonstration usually communicates what the task entails, but not always precisely how to accomplish it, particularly in new situations. Furthermore, it can be challenging to provide useful negative demonstrations, since it may not be obvious to the user where the agent's difficulty arises from. Alternatively, it is easy for a user to provide successor-failure feedback, while exploratory interaction is useful for learning the task. As such, techniques described herein are directed towards building a robot agent that can first learn a policy from one demonstration, then try out that policy while receiving binary user feedback, and finally use the feedback to improve its policy such that it can consistently solve the task. This not only can enable the agent to disambiguate its posterior estimate of the task from user feedback, but the continuous trial-and-error refinement procedure can also enable continuous adaptation, such that a robot agent can get better and better at the new task as it receives additional feedback.

This may require some amount of prior knowledge or experience, which can be acquired through meta-learning across a range of previous tasks. To this end, a meta-learning process is described herein that incorporates elements of imitation learning with trial-and-error reinforcement learning. In contrast to previous meta-imitation learning approaches that learn one-shot imitation learning procedures through imitation, techniques described herein enable the agent to continuously improve at the test task through trial-and-error. Further, from the perspective of meta-reinforcement learning algorithms that aim to learn efficient reinforcement learning procedures, this approach also has significant appeal: as the meta-reinforcement learning is scaled towards broader task distributions and increasingly general reinforcement learning procedures, exploration and efficiency can become exceedingly difficult. However, a demonstration can significantly narrow down the search space while also providing a practical means for a user to communicate the goal, enabling the agent to achieve few-shot learning of behavior.

In some implementations, a meta-learning algorithm can be trained such that a meta-learning model enables learning of new behaviors with a single demonstration and a handful of trials. In particular, after receiving a demonstration that illustrates a new goal, the meta-trained agent can learn to accomplish that goal through trial-and-error with only a few binary success-or-failure labels. This approach can effectively learn tasks with new, held-out objects using one demonstration and a handful of trials, while significantly outperforming meta-imitation learning, meta-reinforcement learning, and prior methods that combine demonstrations and reward feedback.

Learning to learn, or meta-learning, has a long-standing history in the machine learning literature. In some implementations, the meta-learning approach builds on and significantly improves upon meta-imitation learning and meta-reinforcement learning, and extends the model-agnostic meta-learning (MAML) algorithm. Unlike prior work in few-shot imitation learning, this method enables the agent to additionally use trial-and-error experience to continue to improve by using an actor-critic model with an inner objective based on temporal-difference error. In contrast to work in multi-task and meta-reinforcement learning, this approach learns to use one demonstration to address the meta-exploration problem. Additionally or alternatively, this technique may not require substantial amounts of on-policy data collection.

Some implementations described herein build upon the idea of meta-learning, or learning to learn, with the goal of acquiring a policy for a new task using one demonstration and a short trial-and-error phase (e.g., a single trial-and-error phase, two trial-and-error phases, less than five trial-and-error phases, less than ten trial-and-error phases, etc.). The model-agnostic meta-learning algorithm (MAML) can enable an agent to combine complementary information coming from the demonstrations and from the trials in order to solve the task with extreme efficiency. The goal of few-shot meta-learning algorithms is to learn new tasks with only a handful of datapoints. Meta-learning methods accomplish this goal by using data collected from many different tasks. These tasks might entail different skills such as grasping an objects or sliding objects, manipulating different objects such as grasping cups or grasping teapots, or recognizing and manipulating objects with different visual appearances and textures. Meta-learning assumes that these tasks have some shared structure (e.g., belonging to the class of table-top, object manipulation tasks) and are drawn from some underlying distribution $p(\mathcal{T})$. At a high level, meta-learning algorithms aim to discover the shared structure among the meta-training tasks in a way that can be used to learn new, meta-test tasks much more efficiently than learning from scratch. MAML aims to solve this problem by learning a set of initial parameters, or features, such that a few steps of gradient descent on a small amount of training data leads to effective performance and generalization to new datapoints on that task.

An intra-task training set $\mathcal{D}_{\mathcal{T}}^{\text{train}}$ and intra-task validation set $\mathcal{D}_{\mathcal{T}}^{\text{val}}$ for a single task are sampled from the meta-training set $\mathcal{D}_{\mathcal{T}_{\text{train}}}$. The MAML objective is to minimize the task loss $\mathcal{L}$ on $\mathcal{D}_{\mathcal{T}}^{\text{val}}$ with respect to model parameters θ, following one or more steps of gradient descent of the same task loss on $\mathcal{D}_{\mathcal{T}}^{\text{train}}$:

$$\min_{\theta} \sum_{\mathcal{T}} \mathcal{L}(\theta - \alpha \nabla_{\theta} \mathcal{L}(\theta, \mathcal{D}_{\mathcal{T}}^{\text{train}}), \mathcal{D}_{\mathcal{T}}^{\text{val}}) \qquad (1)$$

By differentiating through (and thereby optimizing) the inner weight update $\theta - \alpha \nabla_\theta \mathcal{L}(\theta, \mathcal{D}_\mathcal{T}^{train})$, MAML can acquire an optimal gradient-descent based learner for modest amounts of data. At meta-test time, this "inner" learning procedure is evaluated on $\mathcal{D}_\mathcal{T}^{train}$, $\mathcal{D}_\mathcal{T}^{val}$ sampled from $\mathcal{D}_{\mathcal{T}_{test}}$.

In some implementations, tasks can be defined as finite-horizon Markov decision processes with states s, actions a, and scalar rewards r(s, a). In order to leverage off-policy data in the meta-training process, actor-critic reinforcement learning techniques can be built upon. In some implementations, the normalized advantage functions (NAF) technique can used, as it provides a simple way to represent and optimize both the actor and the critic with a single computation graph and objective. In particular, normalized advantage functions decompose the Q-value function into the value function and a quadratic advantage function:

$$Q(s_t, a_t; \theta_Q) = A(s_t, a_t; \theta_A) + V(s_t; \theta_V)$$

$$A(s_t, a_t; \theta_A) = -\tfrac{1}{2}(a - \mu(s; \theta_\mu))^T P(s; \theta_P)(a - \mu(s; \theta_\mu)) \quad (2)$$

where parameters $\theta_Q = \{\theta_\mu, \theta_P, \theta_V\}$. This Q-function can be learned through standard Q-learning techniques, for example by minimizing Bellman error:

$$\mathcal{L}_{RL} = \mathbb{E}_{s_t, a_t, s_{t+1}}[(Q(s_t, a_t; \theta_Q) - (r_t + \gamma V(s_{t+1}; \theta_V)))^2].$$

In some implementations, a distribution of tasks $p(\mathcal{T})$ can be assumed, from which the meta-training tasks $\{\mathcal{T}_i\}$ and held-out meta-test $\{\mathcal{T}_i\}$ tasks are drawn. During meta-training, supervision in the form of expert demonstration trajectories $\{\tau_i^*\}$ and a binary reward function $r_i$ that can be queried for each of the meta-training tasks $\mathcal{T}_i$ can be used. After meta-training with this supervision, the goal at meta-test time is to quickly learn a new meta-test task $\mathcal{T}_j$. In some implementations, the robot agent is provided with a single demonstration $\tau_j^*$, and the goal is to succeed at the task within K trials, where the agent receives a binary reward for each trial.

Techniques disclosed herein can learn to learn from both a demonstration and its own trial-and-error episodes. In some implementations, the technique extends MAML: the agent is meta-trained such that, given a demonstration of a new task and optionally some number of trial episodes, it can take one gradient step on an adaptation objective to successfully complete the task. This goal differs from the typical one-shot imitation learning problem in two ways: first, the agent gets to use both demonstrations and trials at meta-test time, and second, it is critical for the agent to be able to infer a good policy with variable numbers of trajectories because it will be learning incrementally at meta-test time. Since the inner loop procedure is what is run at meta-test time, the inner loop of meta-learning needs to be defined according to these two constraints.

To leverage both demonstration and trial episode information, a Q-value function $Q(s, a; \theta_Q)$ can be maintained that is decomposed into the value and normalized advantage function, as in equation (2). Note that, to incorporate both demonstrations from an expert and trials taken by the agent, an imitation learning objective is not necessarily needed since reinforcement learning objectives can also learn from successful trajectories. Thus, in some implementations, the Bellman error $\mathcal{L}_{RL}$ can be used in the inner adaptation step. The adapted Q-value function $Q(s, a; Q(s, a; \phi_Q^i)$ can be obtained by taking gradient steps with respect to $\mathcal{L}_{RL}$ evaluated on a batch of demonstration and trial episodes $\{\tau_1, \ldots, \tau_K\}$ corresponding to task $\mathcal{T}_i$:

$$\phi_Q^i = \theta_Q - \alpha \nabla_{\theta_Q} \frac{1}{k} \sum_{l=1}^{k} \mathcal{L}_{RL}(\theta_Q, \tau_l) \quad (3)$$

where the first episode $\tau_1$ is a demonstration and where $k \in \{1, \ldots, K\}$ are the trials taken by the agent. In some implementations, k can be varied during meta-training to be between 1 and K, inclusive, so the robot agent can infer good policies with varying amounts of data.

When using the NAF representation of Q-value functions, with parameters $\phi_Q^i = \{\phi_\mu^i, \phi_P^i, \phi_V^i\}$, the parameters of the policy $\mu(s; \phi_\mu^i)$ corresponding to this Q-value function can be obtained. In some implementations, $\mu(s; \phi_\mu^i)$ is referred to as the adapted policy. The adapted policy can be meta-trained through direct imitation, behavior cloning, and/or other imitation learning techniques, on another demonstration $\tau^*$ of the same task $\mathcal{T}_i$:

$$\mathcal{L}_{BC}(\phi_\mu^i, \tau^*) = \mathbb{E}_{(s_t, a_t) \sim \tau^*}[(\mu(s_t; \phi_\mu^i) - a_t)^2] \quad (4)$$

Combined, the overall meta-optimization objective is the following:

$$\min_{\theta_\mu, \theta_P, \theta_V} \Sigma_{\mathcal{T}_i} \sum_{k=1}^{K} \mathcal{L}_{BC}(\phi_\mu^i, \tau^*) \quad (5)$$

$$\text{s.t. } \phi_\mu^i = \theta_\mu - \alpha \nabla_{\theta_\mu} \frac{1}{k} \sum_{k=1}^{K} \mathcal{L}_{RL}(\{\theta_\mu, \theta_P, \theta_V\}, \tau_l)$$

Although the demonstration episodes, denoted as $\mathcal{D}^*$, can be collected before meta-training time, the trial episodes need to be selected more carefully. Episodes that are random or do not come close to solving the task will not be informative. Hence, the trial-and-error episodes should be collected from the agent as it is training. A distributed setup can be used where training workers continuously sample data from a replay buffer. Simultaneously, separate collection workers use the agent's latest saved weights to collect trial-and-error experience in the environment, and push those trial episodes into the replay buffer.

Implementations described above with respect to equations (3)-(5) include a trial policy and an adapted trial policy which share weights. A challenge with the trial policy and adapted trial policy share weights can be that updates for the adapted trial policy will also affect the trial policy, thereby changing the distribution of trial trajectories that the adapted trial policy should expect. This can lead to constant recollection of on-policy trial trajectories from the environment during meta-training, which is particularly difficult in real-world problem settings with broad task distributions.

In some implementations, the trial policy and the adapted trial policy can be represented and trained separately, decoupling their optimization. The trial policy and adapted trial policy can be parameterized by $\theta$ and $\phi$ respectively. The parameterized trial policy can be denoted as $\pi_\theta^T(a|s, \{d_{i,k}\})$, and the parameterized adapted trial policy can be denoted as $\pi_\phi^R(a|s, \{d_{i,k}\}, \{\tau_{i,l}\})$. In some implementations, the trial policy $\pi_\theta^T$ is trained and the weights of the trial policy are frozen, while trial data is collected from the environment, $\{\tau_{k,l}\} \sim \pi_\theta^T(a|s, \{d_{i,k}\})$ for each meta-training task $\mathcal{T}_i$. The adapted trial policy $\pi_\phi^R$ can be trained using collected trial data without having to visit the environment again.

The trial policy may be trained in a way that will provide useful exploration for inferring the task. One simple and effective strategy for exploration is posterior or Thompson sampling, i.e. greedily act according to the policy's current belief of the task. To this end, the trial policy can be trained using a meta-imitation learning setup, where for any task $\mathcal{T}_i$ the trial policy conditions on one or a few training demonstrations $\{d_{i,k}\}$ and is trained to maximize the likelihood of the actions under another demonstration of the same task $d_i^{test}$ (which can be sampled from $\mathcal{D}_i^*$ without replacement). This leads to the objective:

$$\mathcal{L}^T(\theta, \mathcal{D}_i^*) = \mathbb{E}_{\{d_{i,k}\}\sim\mathcal{D}_i^*}\mathbb{E}_{d_i^{test}\sim\mathcal{D}_i^*\setminus\{d_{i,k}\}}\mathbb{E}_{(s_t,a_t)\sim d_i^{test}}[-\log\pi_\theta^T(a_t|s_t,\{d_{i,k}\})] \quad (6)$$

The adapted trial policy can be trained in a similar fashion, but by additionally condition on one or a few trial trajectories $\{\tau_{i,l}\}$. In some implementations the trial trajectories can be generated by executing the trial policy in the environment. In some implementations, for any task $\mathcal{T}_i$, a set of demonstration-trial pairs $\mathcal{D}_i = \{(\{d_{i,k}\}, \{\tau_{i,l}\})\}$ can be generated. In some of those implementations, the adapted trial objective is:

$$\mathcal{L}^R(\phi, \mathcal{D}_i, \mathcal{D}_i^*) = \quad (7)$$
$$\mathbb{E}_{\{d_{i,k}\},\{\tau_{i,l}\}\sim\mathcal{D}_i}\mathbb{E}_{d_i^{test}\sim\mathcal{D}_i^*\setminus\{d_{i,k}\}}\mathbb{E}_{(s_t,a_t)\sim d_i^{test}}[-\log\pi_\theta^R(a_t|s_t,\{d_{i,k}\},\{\tau_{i,l}\})]$$

During meta-training, trial policy can be trained by minimizing equation (6) with mini-batches of tasks $\mathcal{T}_i$ and corresponding demonstrations $\mathcal{D}_i^*$. After training, $\theta$ can be frozen to have a fixed trial policy. A set of task demonstrations $\{d_{i,k}\}$ can iteratively be sampled, and one or a few trial trajectories in the environment can be collected using the demonstration conditioned trial policy $\{\tau_{i,l}\}\sim\pi_\theta^T(a|s,\{d_{i,k}\})$. The resulting demonstration-trial pairs $(\{\{d_{i,k}\}, \{\tau_{i,l}\}\})$ can be stored in a dataset $\mathcal{D}_i$. The adapted trial policy $\pi_\phi^R$ can be trained by minimizing equation (7) with mini-batches of tasks $\mathcal{T}_i$ and corresponding demonstration-trial pair datasets $\mathcal{D}_i$. At meta-test time, for any test task $\mathcal{T}_j$, trials $\{\tau_{j,l}\}$ can be generated using the trial policy $\pi_\theta^T(a|s,\{d_{j,k}\})$. Then the adapted trial episode can be executed using the adapted trial policy $\pi_\phi^R(a|s,\{d_{i,k}\},\{\tau_{j,l}\}))$.

Implementations described above with respect to equations (1)-(7) use a reward signal provided by a human observer to generate additional training data. Additional or alternative implementations can include autonomously generating additional training data. In some implementations, meta-imitation can be used to learn from autonomous data collection, while minimizing the amount of human supervision needed for learning. A robot agent can be bootstrapped from meta-imitation learning on, for example, human teleoperation episodes of several different tasks. This initial meta-imitation dataset can be used to (a) learn a meta-imitation policy that can perform a variety of skills depending on what demonstration it is conditioned on, and (b) to learn a latent space of useful skills, which can later can be used for characterizing new skills discovered during autonomous operation. Using the learned meta-imitation policy, episodes of meaningful behavior can be collected by randomly sampling from the space of useful skills (or tasks). These new episodes are then organized into a meta-imitation dataset using the learned latent space of skills. In some implementations, the meta-policy can be re-trained using this expanded meta-imitation dataset.

In some implementations, a meta-policy can be trained that consists of two networks: an embedding network, and a control network. The meta-policy can be trained using a dataset of paired demonstrations (i.e., pairs of optimal trajectories corresponding to the same task). In some implementations, the meta-policy can be optimized such that the embedding network learns to embed each demonstration in a task space, where the task space is a latent space of useful skills. Additionally or alternatively, the control network can learn how to perform a task when conditioned on a particular skill in the form of a task embedding. In some implementations, the meta-policy (also referred to as the behavior policy) can be used to sample trajectories in new environments, and these sampled trajectories (also referred to herein as rollouts) can be added to a rollout dataset. In some implementations, each of the collected rollout can be embedded in the task space. Distances in this task space can be used to determine whether any two embedded rollouts belong to the same task or not. If a pair of rollouts is determined to belong to the same task, this pair can be added to the original dataset of optimal demonstrations. In some implementations, a new meta-policy can be learned from this expanded dataset.

This framework can allow a system to perform meta-imitation learning on large, autonomously collected datasets. In some implementations, many policy rollouts can be collected and autonomously labeled as corresponding to the same task. The autonomously labeled rollouts can be used for improving the learned policy's performance. In some implementations, the goal is to learn a policy that can adapt to new, unseen tasks from just a single demonstration for that task.

In some implementations, a distribution of tasks $p(\mathcal{T})$ can be assumed. A meta-training set of tasks $\{\mathcal{T}_i\}$ can be drawn from the distribution of tasks. In some implementations, a set of paired demonstrations $\mathcal{D}_i^* := \{(d_i, d_j)\}$ corresponding to a subset of the meta-training tasks can be used. Each demonstration $d_i$ includes a trajectory of observations and actions denoting optimal behavior for that task $d_i = [(o_1, a_1), \ldots, (o_H, a_H)]$. However, unlike a meta-imitation learning setting that can only assume access to a static set of demonstrations, some implementations can draw new trajectories from the meta-training tasks $\{\mathcal{T}_i\}$ according to a policy. This is similar to using meta-reinforcement learning. However, task-specific reward functions for any of the tasks in the meta-training set are not required, which can allow for sampling new trajectories autonomously, without external supervision.

In some implementations, meta-policy can be used that consists of two neural networks: an embedding network and a control network. The embedding network, represented as $\psi$, can be used to process as input, a video demo of the task to be performed, where the video demonstration of the task to be performed is represented as $d^v$. In some implementations, the embedding network can consist of a convolutional neural network followed by 1-D temporal convolutions. In some implementations, the embedding network can be used embed the demonstration video into a fixed-length vector, denoted as $\psi(d^v)$ and refer to as the demonstration embedding. In some implementations, the demonstration embeddings can have the following property: demonstrations embeddings can be close to each other if the demonstrations correspond to the same task, and are further apart for demonstrations that belong to different tasks. In other words, the distance $D(d_1^v, d_2^v) = \|\psi(d_1^v) - \psi(d_2^v)\|_2$ can be low when $d_1^v$ and $d_2^v$ correspond to the same task, and can be high when they do not correspond to the same task. In some implementations, a contrastive loss function $\mathcal{L}_c$ can be used:

$$\mathcal{L}_c = (1-Y)D(d_1^v, d_2^v)^2 + Y\max(0, m - D(d_1^v, d_2^v)^2)) \quad (8)$$

where the variable Y=0 when the two demonstrations $d_1^v$ and $d_2^v$ correspond to the same task, and Y=1 when the two demonstrations correspond to different tasks.

In some implementations, the control network can process an image of the current scene (along with other parts of the robot's state such as end-effector pose), to generate a robot action. In order to learn to predict actions from this information, the maximum likelihood behavior cloning loss $\mathcal{L}_b$ can be used. In some implementations, the complete loss function can be denoted by $\mathcal{L} = \mathcal{L}_b + \mathcal{L}_c$. In some of those imitations, $\mathcal{L}$ can be minimized using the Adam optimizer. Additionally or alternatively, both the embedding network and control network can be trained jointly, sharing the convolutional layers between them. The output of this procedure results in a behavior policy $\pi_\theta^B$ (also referred to herein as a meta-policy), where $\theta$ denotes the learned parameters of this policy.

In some implementations, the behavior policy can be used for collecting data in new environments. Given a scene, the learned policy can be conditioned on a randomly sampled demonstration from the demonstration dataset $\mathcal{D}$ which initially includes human guided demonstrations. The policy can then be rolled out in the new scene, and the corresponding rollout(s) can be added to the rollout dataset $\mathcal{R}$. After one or more iterations, the rollout dataset can be filtered to remove spurious behavior. For example, if the policy knocks an object off the table in a given scene, this rollout can be removed from the dataset since it is not desirable for a system to replicate this behavior. In some implementations, a dot product (in the embedding space) can be calculated for all possible pairs of rollouts in $\mathcal{R}$, and pairs with a high dot product (measured by some predefined threshold $\alpha$) can be labeled as belonging to the same task, and added to the dataset $\mathcal{D}$. In some implementations, meta-imitation learning can be performed using the expanded dataset $\mathcal{D}$ (e.g., the dataset contains the autonomously labeled rollout pairs), optimizing the loss $\mathcal{L}$ defined in equation (8), to generate a policy $\pi_\phi$, with the same architecture as $\pi_\theta$.

Turning now to the figures, example robot 100 is illustrated in FIG. 1. Robot 100 is a "robot arm" having multiple degrees of freedom to enable traversal of grasping end effector 102 along any of a plurality of potential paths to position the grasping end effector 102 in a desired location. Robot 100 further controls the two opposed "claws" of its grasping end effector 102 to actuate the claws between at least an open position and a closed position (and/or optionally a plurality of "partially closed" positions).

Example vision component 106 is also illustrated in FIG. 1. In FIG. 1, vision component 106 is mounted at a fixed pose relative to the base or other stationary reference point of robot 100. Vision component 106 includes one or more sensors that can generate images and/or other vision data related to shape, color, depth, and/or other features of object(s) that are in the line of sight of the sensors. The vision component 106 may be, for example, a monographic camera, a stereographic camera, and/or a 3D laser scanner. A 3D laser scanner may be, for example, a time-of-flight 3D laser scanner or a triangulation based 3D laser scanner and may include a position sensitive detector (PDS) or other optical position sensor.

The vision component 106 has a field of view of at least a portion of the workspace of the robot 100, such as the portion of the workspace that includes example object 104A. Although resting surface(s) for object 104 is not illustrated in FIG. 1, those objects may rest on a table, a tray, and/or other surface(s). Objects 104 may include a spatula, a stapler, and a pencil. In other implementations, more objects, fewer objects, additional objects, and/or alternative objects may be provided during all or portions of grasp attempts of robot 100 as described herein.

Although a particular robots 100 is illustrated in FIG. 1, additional and/or alternative robots may be utilized, including additional robot arms that are similar to robot 100, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effects may be utilized, such as alternative impactive grasping end effectors (e.g., those with grasping "plates", those with more or fewer "digits"/"claws"), ingressive grasping end effectors, astrictive grasping end effectors, contigutive grasping end effectors, or non-grasping end effectors. Additionally, although a particular mountings of vision component 106 is illustrated in FIG. 1, additional and/or alternative mountings may be utilized. For example, in some implementations, vision components may be mounted directly to robots, such as on non-actuable components of the robots or on actuable components of the robots (e.g., one the end effector or on a component close to the end effector). Also, for example, in some implementations, a vision component may be mounted on a non-stationary structure that is separate from its associated robot and/or may be mounted in a non-stationary manner on a structure that is separate from its associated robot.

Data from robot 100 (e.g., state data) can be utilized to train a meta-learning model 114 using meta-learning model training engine 108. For example, meta-learning model training engine 108 can train a trial policy and/or an adapted trial policy of meta-learning model 114 using meta-learning. Meta-learning model training engine 108 can include imitation learning training engine 110, reinforcement learning training engine 112, and/or additional engine(s) (not depicted). In some implementations, imitation learning training engine 110 can train meta-learning model 114 using human guided demonstration(s) 116, where each demonstration captures robot 100 performing a task. For example, a trial policy of meta-learning model 114 can be trained, by imitation learning engine 110, using imitation learning. Additionally or alternatively, reinforcement learning training engine 112 can train meta-learning model 114 based on one or more trials 118 of the robot 100 performing the task. Trial generator engine 120 can generate one or more trials 118 using the trial policy of meta-learning model 114.

In some implementations, the trial policy and the adapted trial policy are integrated into a single model, where updates to one or more portions of the trial policy with also change one or more portions of the adapted trial policy. Similarly, changes to one or more portions of the adapted trial policy will change one or more portions of the trial policy. In some such implementations, trial generator engine 120 can continuously generate trials based on the trial policy as the trial policy changes over time. These trials can then be used by reinforcement learning training engine 112 to train the adapted policy of meta-learning model 114, which will in turn update the trial policy of meta-learning model 114 as well. This updated trial policy can then be used by trial generator engine 120 in generating one or more additional trials. These additional trials can subsequently be used by reinforcement learning training engine 112 to update the adapted trial policy, which in turn will update the trial policy. This cycle of updating the trial policy based on training the adapted trial policy, using the updated trial policy in generating additional trial(s), and using the additional trial(s) in updating the adapted trial policy can repeat until training the meta-learning model is complete.

In some other implementations, the trial policy is decoupled and separately optimized from the adapted trial policy. In some such implementations, imitation learning training engine 110 can train the trial policy of meta-learning model 114 using one or more human guided demonstrations 116 of the robot performing a new task. The trial policy can then be frozen. The frozen trial policy can be used by trial generator engine 120 to generate one or more trials 118 of the robot attempting to perform the task. These trial(s) 118 can be used by reinforcement learning training engine 112 to train the adapted policy of meta-learning model 114. Decoupling the trial policy and the adapted trial policy can eliminate the need to continuously generate on-policy trials.

Furthermore, reinforcement learning training engine 112, when training the adapted trial policy, can utilize a reward indicating whether the robot successfully completed a new task in a trial 118. In some implementations, this reward can be a sparse reward signal. For example, a human can provide, through one or more user interface inputs at a client device, a binary reward indication of success or failure, indicating whether the robot successfully completed the task in a trial and error attempt.

Figure 2A:
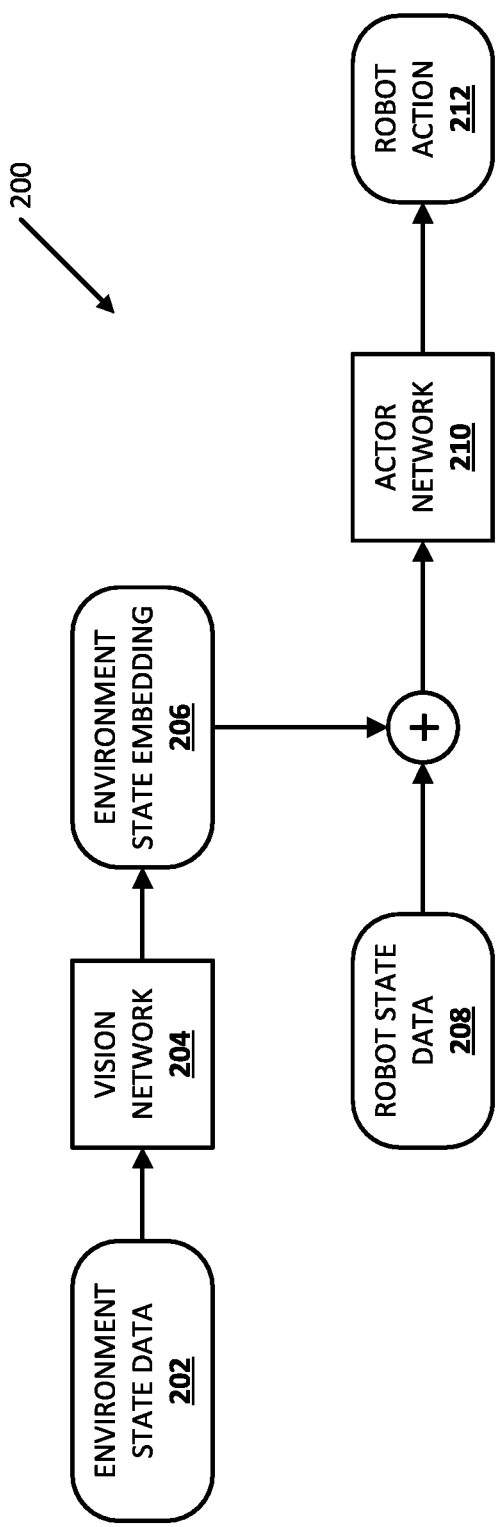
FIG. 2A illustrates an example meta-learning model in accordance with implementations described herein.

FIG. 2A illustrates an example meta-learning model 200 in accordance with implementations disclosed herein. Environment state data 202 captures information regarding the current environment of the robot. In some implementations, environment state data can be captured using a vision component, such as vision component 106 illustrated in FIG. 1. For example, environment state 202 can include one or more images of the environment captured using a RGB camera and/or other vision data captured using vision component(s). Also, for example, environment state 202 can additionally or alternatively include feature(s) of the environment predicted based on vision data and/or other sensor data. For instance, environment state data 202 can include pose(s) and/or classification(s) of object(s) in the environment, determined based on vision data. Environment state data 202 can be processed using vision network 204 to generate an environment state embedding 206. In some implementations, environment state embedding 206 represents one or more visual features of the environment of the robot. Additionally or alternatively, in some implementations, the robot can be a simulated robot, where environmental state data 202 is captured from the simulated robot. For instance, the environment state data 202 can include simulated vision data (e.g., rendered image(s)) that capture the simulated environment of the simulated robot.

The environment state embedding can be combined with robot state data 208. For example, the environment state embedding 206 can be concatenated with robot state data 208. In some implementations, the robot state data 208 can include a representation of a current end-effector pose, a current end effector angle, a current end effector velocity, and/or additional information about the current position of the robot and/or one or more components of the robot. For example, the robot state data can include at least a representation of the pose of the end effector in task space, such as a six-dimensional pose that can indicate an X, Y, Z, position of the end effector, as well as an orientation of the end effector. In the illustrated example, actor network 210 is a trained meta-learning model which can be used to generate one or more robot actions 212 to perform a robotic task based on the current state of the environment and the robot.

Figure 2B:
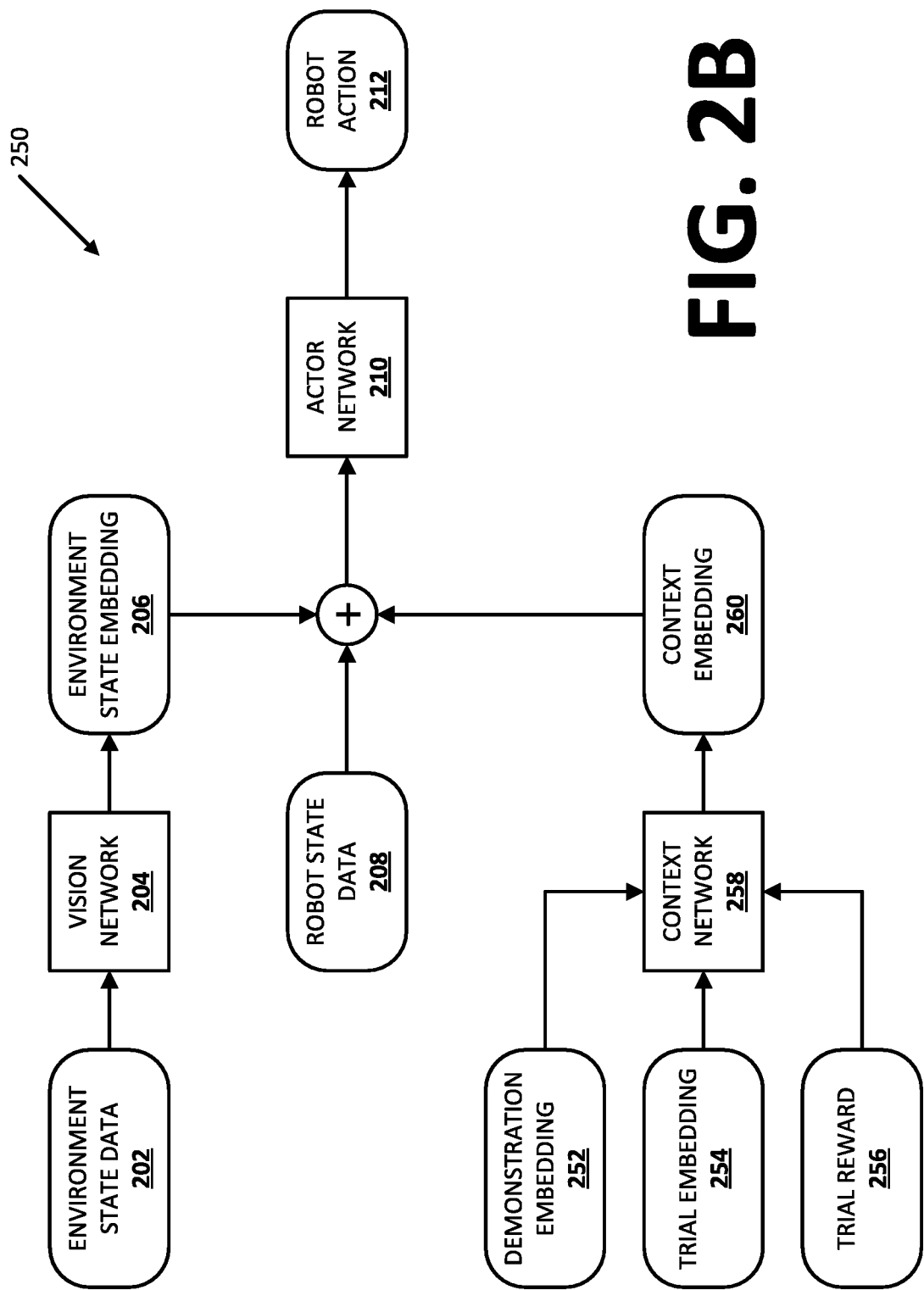
FIG. 2B illustrates another example meta-learning model in accordance with implementations described herein.

FIG. 2B illustrates an example meta-learning model 200 in accordance with implementations disclosed herein. As described above, environment state data 202 can be processed using vision network 204 to generate environment state embedding 206. Environment state embedding 206 can be combined with robot state data 208. In the illustrated example, environment state embedding 206 and robot state data 208 are additionally combined with a context embedding 260. For example, environment state embedding 206 can be concatenated with robot state data 208 and context embedding 260.

Context embedding 260 can provide a representation of a new task. A demonstration embedding 252 can capture feature(s) of a human guided demonstration for a task. For example, demonstration data can include a video of the human guided demonstration of the robot performing the task. The video can be sampled (e.g., a sequence of still images can be captured from the demonstration video), and the sample(s) of the demonstration video can be processed using an additional vision network to generate the demonstration embedding.

Similarly, trial embedding 254 can capture feature(s) of a trial and error attempt of performing the task. Trial reward 256 can provide an indication of whether the trial captured in trial embedding 254 was a successful attempt at performing the task. Demonstration embedding 252, trial embedding 254 and trial reward 256 can be combined. For example, demonstration embedding 252 can be concatenated with trial embedding 254 and trial reward 256. This combination can be provided to context network 258 to generate context embedding 260. The combination of environment state embedding 206, robot state data 208, and context embedding 260 can be provided to actor network 210 to generate a robot action 212 to perform the robot task.

Figure 3:
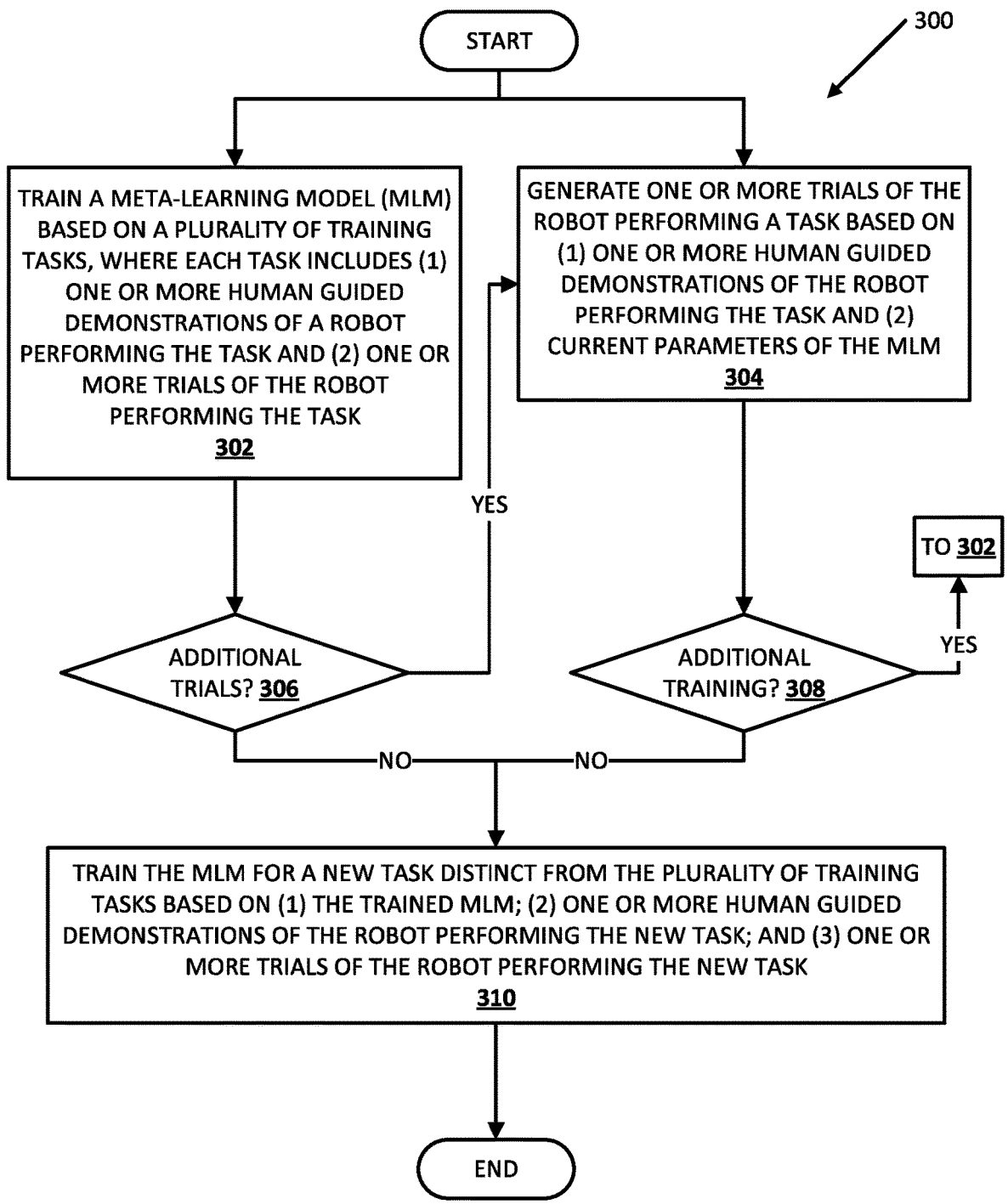
FIG. 3 is a flowchart illustrating an example process of training a meta-learning model in accordance with implementations disclosed herein.

FIG. 3 is a flowchart illustrating an example process 300 of training a meta-learning model using a plurality of training tasks, and training the trained meta-learning model for a new task, in accordance with implementations disclosed herein. For convenience, the operations of the flowchart are described with reference to a system that performs the operations. This system may include one or more components of a robot and/or a computing device, such as processor(s) of a robot and/or computing device and/or robot control system of robot 100, 102S, and/or other robot(s). Moreover, while operations of process 300 are shown in a particular order, this is not meant to be limiting. One or more operations may be reordered, omitted, and/or added.

At block 302, the system trains a meta-learning model based on a plurality of training tasks, where each task includes (1) one or more human guided demonstrations of a robot and (2) one or more trials of the robot performing the task. In some implementations, the one or more trials are generated at block 304. In some implementations, the meta-learning model is trained in accordance with process 400 of FIG. 4.

At block 304, the system generates one or more trials of the robot performing the task based on (1) one or more human guided demonstrations of the robot performing the task and (2) a trial policy of the meta-learning model. For example, a generated trial can include a sequence of robot actions and corresponding robot states, where the robot performs an action to transition from the current state to the next state. In some implementations, the states can include environmental state data (such as environment state data 202 of FIGS. 2A and 2B) capturing the current environment of the robot as well as robot state data (such as robot state data 208 of FIGS. 2A and 2B) capturing the current position(s) and/or other feature(s) of component(s) of the robot. In some implementations, the trial policy of the meta-learning model is generated at block 302. In some implementations, the system generates the one or more trials in accordance with process 500 of FIG. 5.

At block 306, the system determines whether to generate any additional trials of the robot preforming a task. If so, the system can proceed to block 304 and generate one or more additional trials based on the trial policy of the meta-learning model. In some implementations, the system can generate the one or more additional trials based on the trial policy and the same task as the previous iteration. In some other implementations, the system can generate one or more additional trials based on the trial policy and based on an additional task (e.g., using a guided demonstration for the additional task, and trial(s) for the additional task). If not, the system can proceed to block 310. For example, the system can determine to not generate any additional trials when the system has completed training the meta-learning model.

At block 308, the system determines whether to perform any additional training of the meta-learning model. If so, the system can proceed to block 302 and continues to train the adapted trial policy of the meta-learning model using one or more of the generated trials. If not, the system can proceed to block 310. For example, the system can determine to not perform any additional training of the meta-learning model when the meta-learning model has been trained using a threshold number of training tasks, trained using all training tasks, trained a threshold duration of time, and/or when additional or alternative condition(s) have been satisfied.

At block 310, the system trains the trained meta-learning model for a new task that is distinct from the plurality of training tasks, and performs the training based on: (1) the trained meta-learning model; (2) one or more human guided demonstrations of the robot performing the new task; and (3) one or more trials of the robot performing the new task. In some implementations, the system trains the trained meta-learning model for the new task in accordance with process 600 of FIG. 6.

Figure 4:
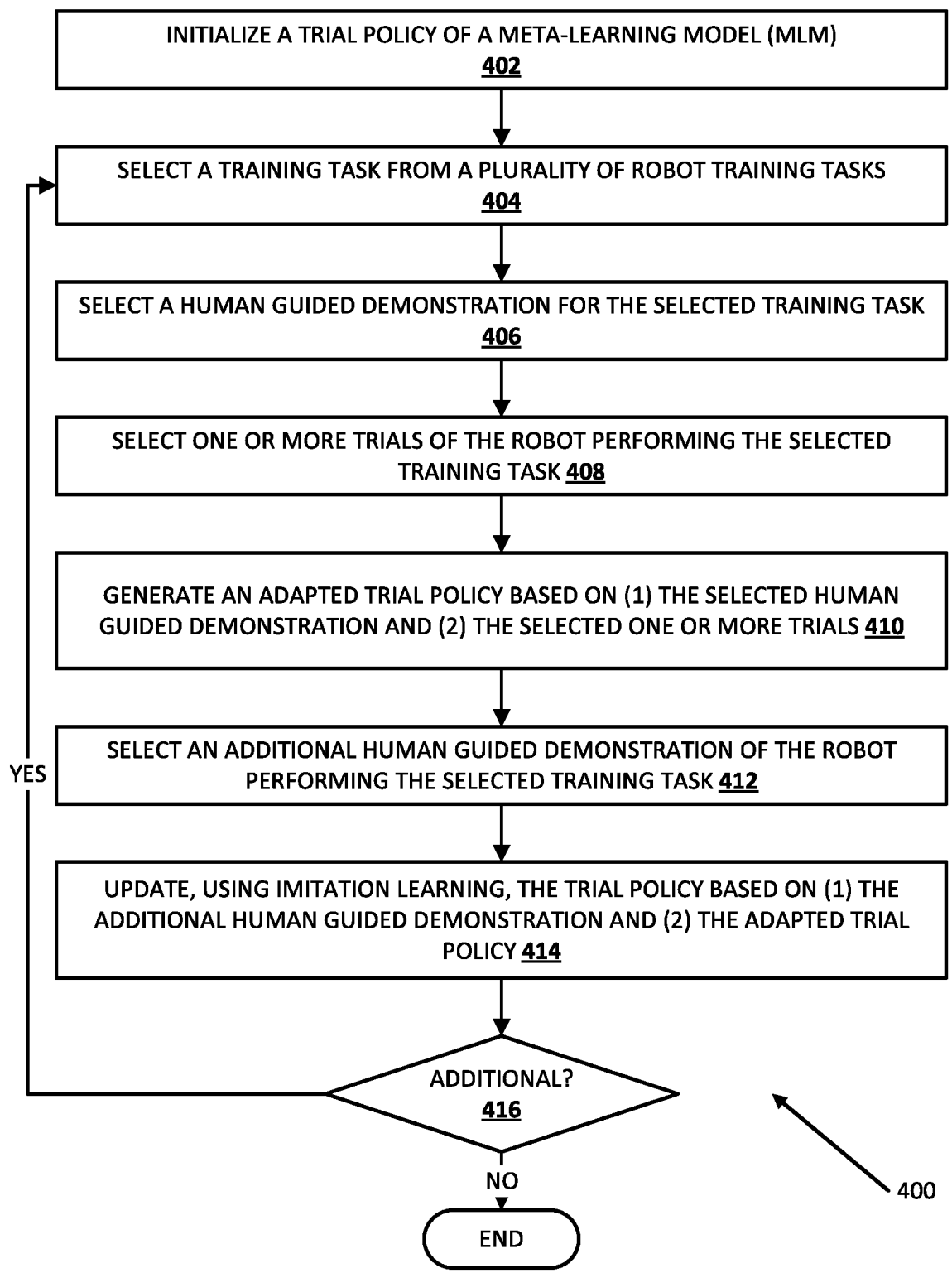
FIG. 4 is a flowchart illustrating an example process of training a meta-learning model using imitation learning in accordance with implementations disclosed herein.

FIG. 4 is a flowchart illustrating an example process 400 of training a meta-learning model using imitation learning and reinforcement learning in accordance with implementations disclosed herein. For convenience, the operations of the flowchart are described with reference to a system that performs the operations. This system may include one or more components of a robot and/or a computing device, such as processor(s) of a robot and/or computing device and/or robot control system of robot 100, 1025, and/or other robot(s). Moreover, while operations of process 400 are shown in a particular order, this is not meant to be limiting. One or more operations may be reordered, omitted, and/or added.

At block 402, the system initializes a trial policy of a meta-learning model. In some implementations, the trial policy can be learned using Q-learning functions. In some of those implementations, the Q-learning functions can be normalized advantage functions.

At block 404, the system selects a training task from a plurality of disparate robot training tasks.

At block 406, the system selects a human guided demonstration for the selected training task.

At block 408, the system selects one or more trials of the robot performing the selected training task. In some implementations, the one or more trials are continuously generated based on the trial policy in accordance with process 500 of FIG. 5.

At block 410, the system generates an adapted trial policy based on (1) the selected human guided demonstration and (2) the selected one or more trials. In some implementations, the adapted trial policy is generated using reinforcement learning. In some implementations, a reward is provided by a human observer indication whether the task was successfully completed in the trial. This reward can be used when training the adapted trial policy using reinforcement learning.

At block 412, the system selects an additional human guided demonstration of the robot performing the selected training task. In some implementations, the human guided demonstration is a sampling of demonstration data (e.g., a video of the robot performing the task). In some of those implementations, the additional human guided demonstration is an additional sampling of the same demonstration data. Additionally or alternatively, the additional demonstration can be a sampling from demonstration data capturing a separate human guided demonstration of the task.

At block 414, the system updates, using imitation learning, the trial policy based on (1) the additional human guided demonstration and (2) the adapted trial policy.

At block 416, the system determines whether perform any additional training of the meta-learning model. If so, the system proceeds back to block 404 and selects an additional training task before proceeding to blocks 406, 408, 410, 412, and 414 using the additional training task. If the system determines to not perform additional training, the process ends. For example, the system may determine to not perform additional training when the meta-learning model has been trained using all training tasks, when a threshold number of training epochs have been completed, etc.

Figure 5:
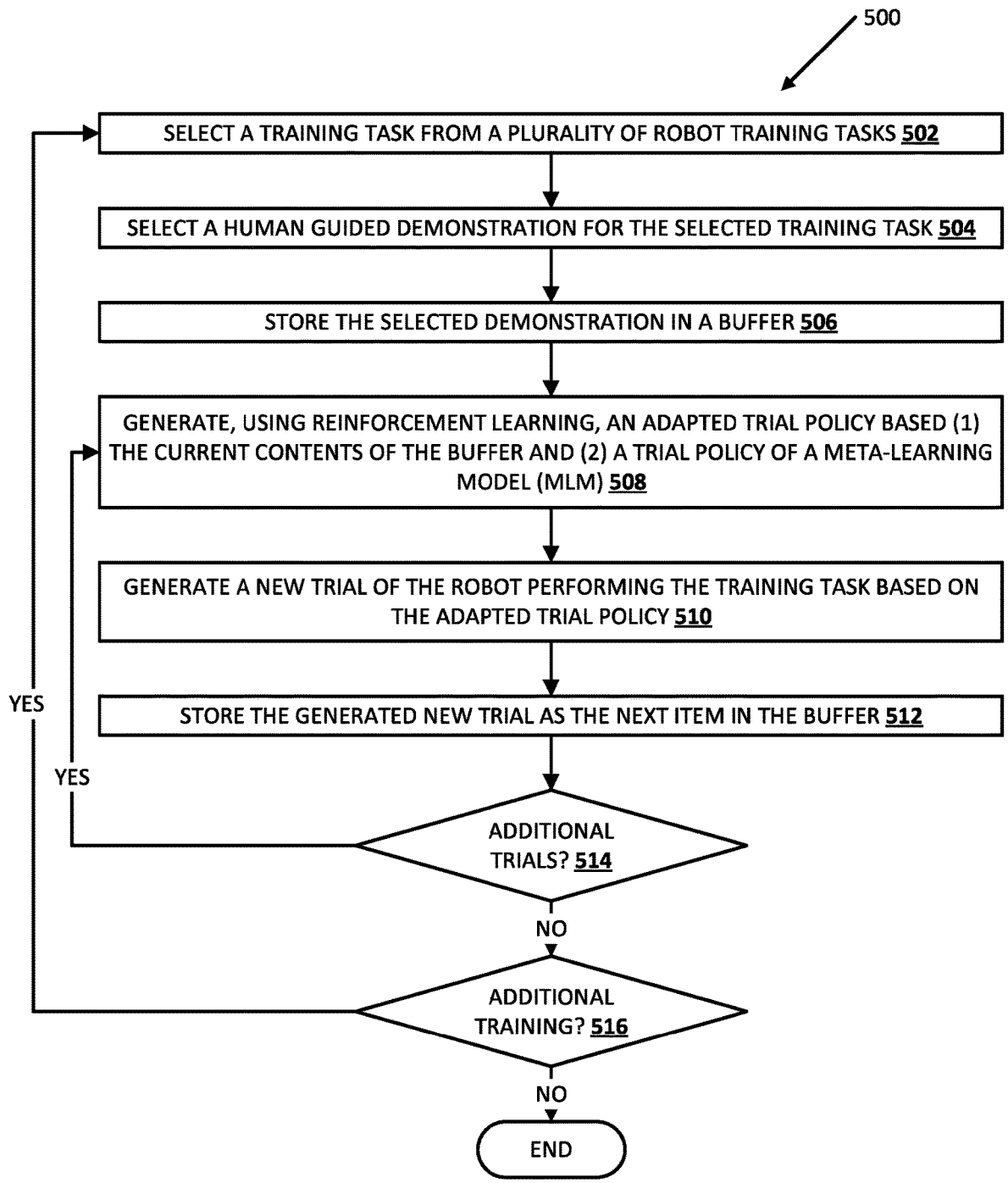
FIG. 5 is a flowchart illustrating an example process of generating trials for use in training a meta-learning model using reinforcement learning in accordance with implementations disclosed herein.

FIG. 5 is a flowchart illustrating an example process 500 of generating one or more trials for use in training a meta-learning model in accordance with implementations disclosed herein. For convenience, the operations of the flowchart are described with reference to a system that performs the operations. This system may include one or more components of a robot and/or a computing device, such as a processor(s) of a robot and/or computing device and/or robot control system of robot 100, 1025, and/or other robot(s). Moreover, while operations of process 500 are shown in a particular order, this is not meant to be limiting. One or more operations may be reordered, omitted, and/or added.

At block 502, the system selects a training task from a plurality of robot training tasks.

At block 504, the system selects a human guided demonstration for the selected training task.

At block 506, the system stores the selected human guided demonstration in a buffer.

At block 508, the system generates, using reinforcement learning, an adapted trial policy based on (1) the current contents of the buffer and (2) a trial policy of a meta-learning model. In some implementations, the trial policy of the meta-learning model is generated using process 400 of FIG. 4.

At block 510, the system generates a new trial of the robot performing the training task based on the adapted trial policy.

At block 512, the system stores the generated new trial as the next item in the buffer.

At block 514, the system determines whether to generate any additional trials. If so, the system proceeds back to block 508, and generates an updated adapted trial policy based on the trial policy and the contents of the buffer (including the generated new trial), before proceeding back to blocks 510 and 512 based on the updated adapted trial policy. If, at block 514, the system determines to not generate any additional trials, the system proceeds to block 516. For example, the system can determine whether the robot successfully completed the task in the trial, and can generate additional trials until the robot successfully completes the task. Additionally or alternatively, additional trials can be generated until a threshold number of trials has been generated (e.g., 3 trials have been generated, 5 trials have been generated, 10 trials have been generated, etc.) and/or other condition(s) satisfied.

At block 516, the system determines whether to generate trial(s) for any additional training tasks. If so, the system proceeds back to block 502 and selects an additional training task, before proceeding to blocks 504, 506, 508, 510, 512, and 514 based on the additional training task. If the system determines to not generate trials for any additional training tasks, the process 500 ends. For example, the system can determine to not generate trials for any additional training tasks when training of the meta-learning model is complete.

Figure 6:
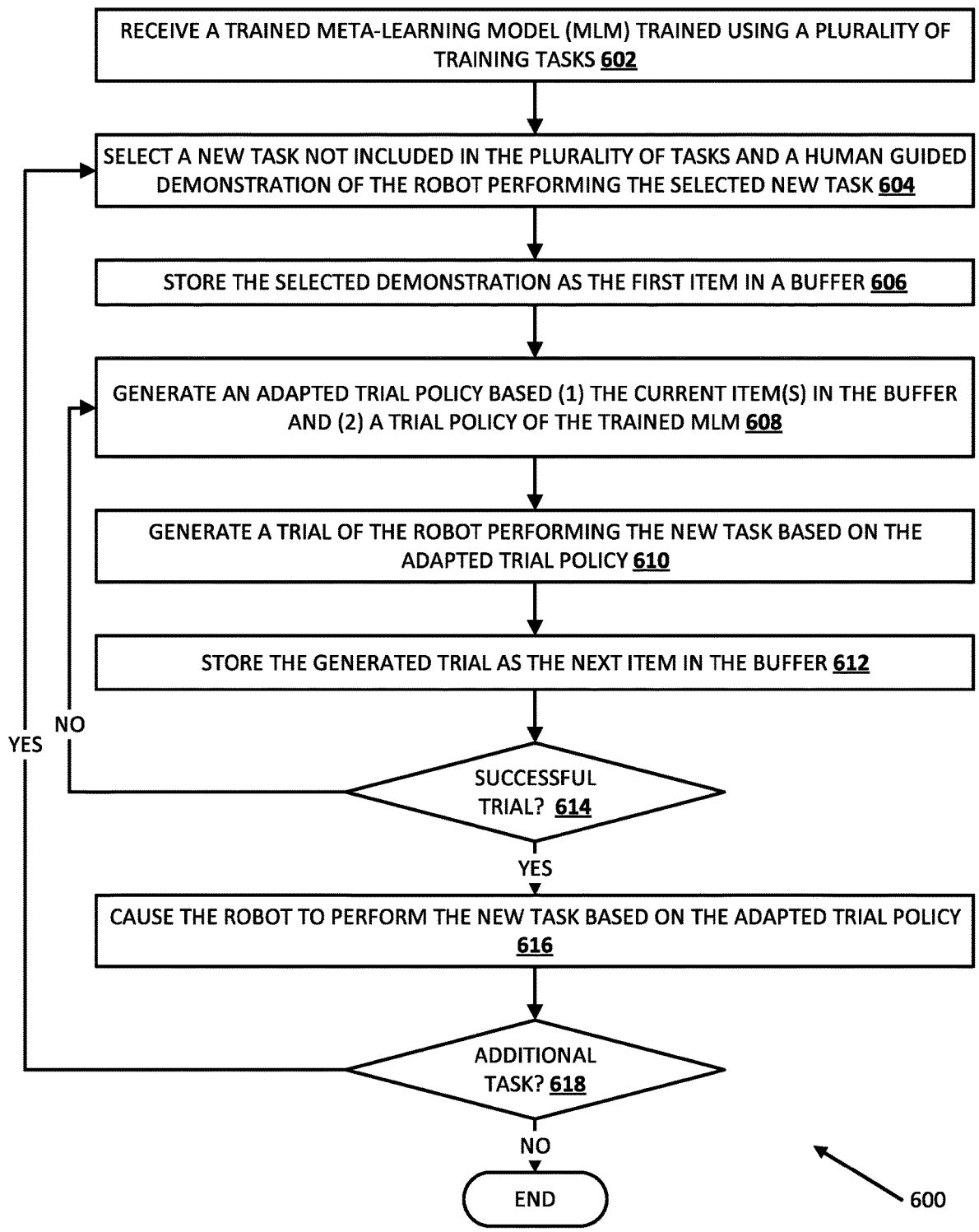
FIG. 6 is a flowchart illustrating an example process of training a trained meta-learning model for a new task in accordance with implementations disclosed herein.

FIG. 6 is a flowchart illustrating an example process 600 of training a trained meta-learning model for a new task in accordance with implementations disclosed herein. For convenience, the operations of the flowchart are described with reference to a system that performs the operations. This system may include one or more components of a robot and/or a computing device, such as a processor(s) of a robot and/or computing device and/or robot control system of robot 100, 1025, and/or other robot(s). Moreover, while operations of process 600 are shown in a particular order, this is not meant to be limiting. One or more operations may be reordered, omitted, and/or added.

At block 602, the system receives a trained meta-learning model trained using a plurality of training tasks. In some implementations, the trained meta-learning model is trained in accordance with process 400 of FIG. 4.

At block 604, the system selects a new task that is not included in the plurality of training tasks used in training the trained meta-learning model. At block 604, the system also selects a human guided demonstration of the robot performing the selected new task.

At block 606, the system stores the selected demonstration as the first item in a buffer.

At block 608, the system generates an adapted trial policy based on (1) the current item(s) in the buffer and (2) a trial policy of the trained meta-learning model.

At block 610, the system generates a trial of the robot performing the new task based on the set of adapted trial parameters. In some implementations, the system generates the trial in accordance with process 500 of FIG. 5.

At block 612, the system stores the generated trial as the next item in the buffer.

At block 614, the system determines whether the robot successfully performed the task in the generated trial. If so, the system proceeds to block 616. If not, the system proceeds back to block 608, generates and updated adapted trial policy based on the trial policy and the contents of the buffer (including the trial generated at the previous iteration), and proceeds to blocks 610 and 612 based on the updated adapted trial policy. In some implementations, a human observer provides an indication of whether the robot successfully performed the task in the generated trial.

Additionally or alternatively, even when there is not a successful trial, the system may in some implementations proceed to block 616 after a threshold number of trials have been generated (e.g., 1 trial, 2 trials, 3 trials, 5 trials, 10 trials, etc.) and/or other condition(s) have been satisfied.

At block 616, the system causes the robot to perform the new task based on the adapted trial policy.

At block 618, the system determines whether to train the trained meta-learning model for any additional new tasks. If so, the system proceeds back to block 604, selects an additional new task, and proceeds to blocks 606, 608, 610, 612, 614, and 616 based on the additional new task. If the system determines to not train the trained meta-learning model for any additional new tasks, the process ends.

Process 600 of FIG. 6 is an illustrative example of single shot learning the new task, where the meta-learning models is trained to perform the new task using a single human guided demonstration at block 604. Additionally or alternatively, the system can few shot learn the new task by performing multiple iterations of training the meta-learning model based on a selected demonstration (i.e., performing an iteration of blocks 606, 608, 610, 612, and 614 based on the selected demonstration). For example, the system can train the meta-learning model using a few demonstrations (e.g., two demonstrations, three demonstrations, less than 5 demonstrations, less than 10 demonstrations, etc.).

Figure 7:
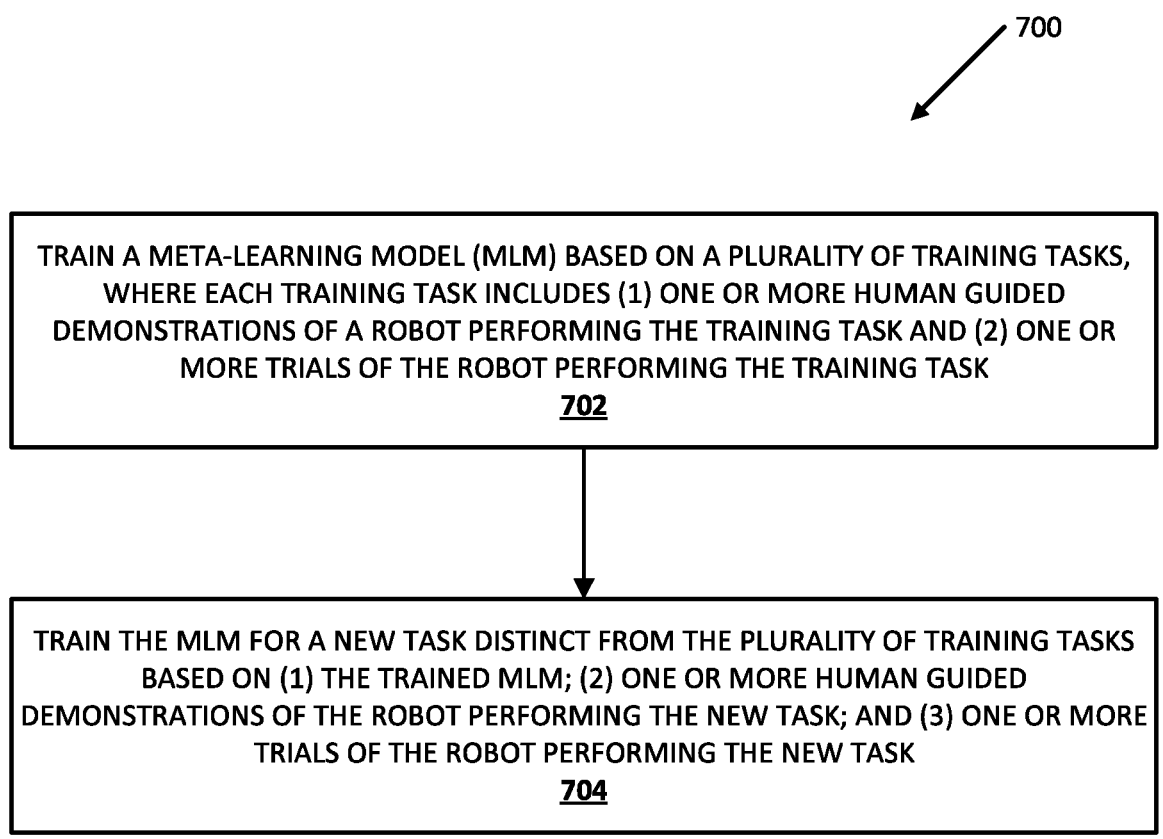
FIG. 7 is a flowchart illustrating another example process of training a meta-learning model in accordance with implementations disclosed herein.

FIG. 7 is a flowchart illustrating an example process 700 of training a meta-learning model using a plurality of training task and training the trained meta-learning model for a new task in accordance with implementations disclosed herein. For convenience, the operations of the flowchart are described with reference to a system that performs the operations. This system may include one or more components of a robot and/or a computing device, such as a processor(s) of a robot and/or computing device and/or robot control system of robot 100, 1025, and/or other robot(s). Moreover, while operations of process 700 are shown in a particular order, this is not meant to be limiting. One or more operations may be reordered, omitted, and/or added.

At block 702, the system trains a meta-learning model based on a plurality of training tasks, where each training task includes (1) one or more human guided demonstrations of a robot performing the training task and (2) one or more trials of the robot performing the training task. In some implementations, the system trains the meta-learning model in accordance with process 800 of FIG. 8.

At block 704, the system trains the trained meta-learning model for a new task that is distinct form the plurality of training tasks, where the training is based on: (1) the trained meta-learning model; (2) one or more human guided demonstrations of the robot performing the new task; and (3) one or more trials of the robot performing the new task. In some implementations, the system trains the trained meta-learning model for a new task in accordance with process 900 of FIG. 9.

Figure 8:
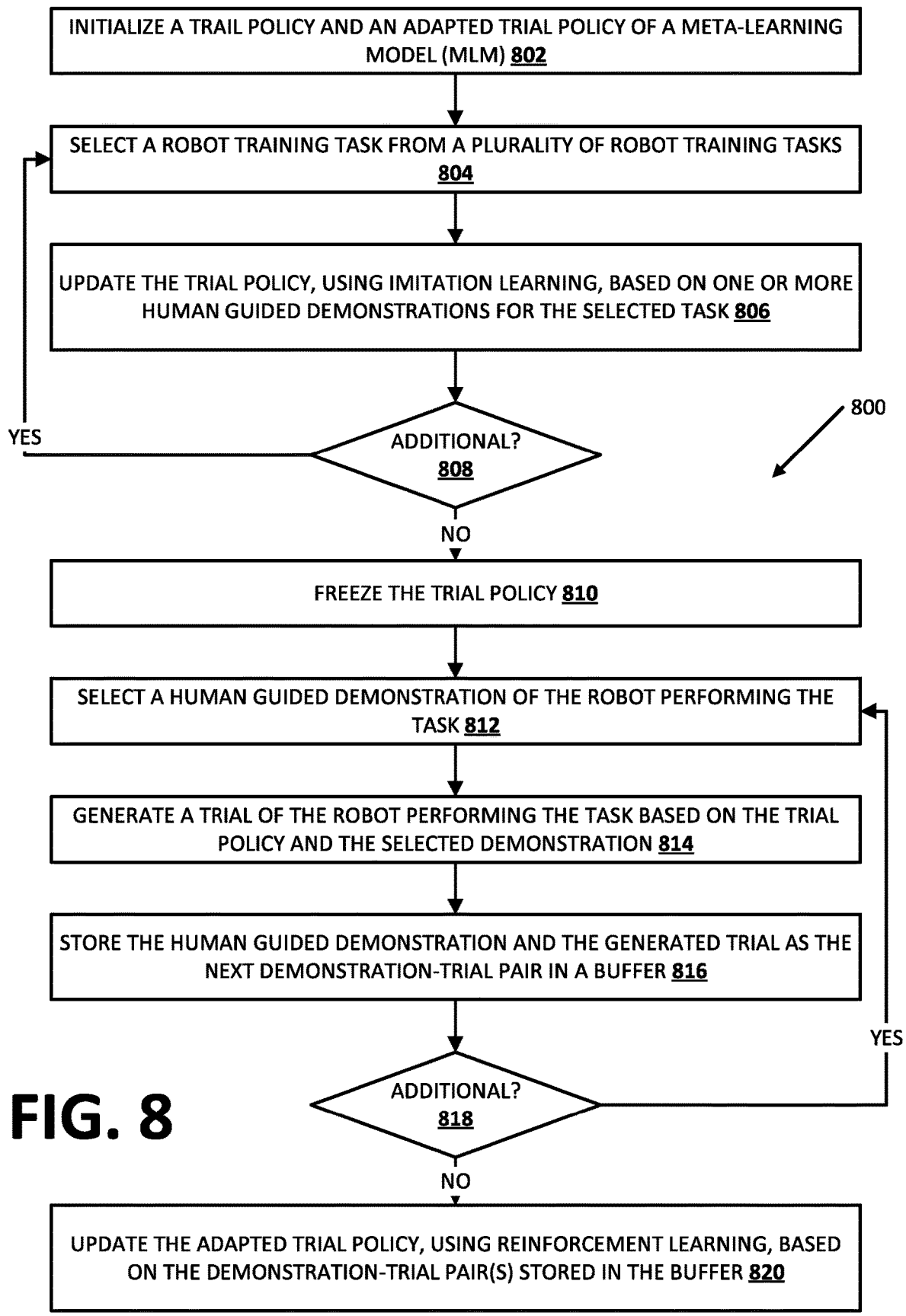
FIG. 8 is a flowchart illustrating an example process of training a meta-learning model using imitation learning and reinforcement learning in accordance with implementations disclosed herein.

FIG. 8 is a flowchart illustrating an example process 800 of training a meta-learning model using imitation learning and reinforcement learning in accordance with implementations disclosed herein. For convenience, the operations of the flowchart are described with reference to a system that performs the operations. This system may include one or more components of a robot and/or a computing device, such as a processor(s) of a robot and/or computing device and/or robot control system of robot 100, 1025, and/or other robot(s). Moreover, while operations of process 800 are shown in a particular order, this is not meant to be limiting. One or more operations may be reordered, omitted, and/or added.

At block 802, the system initialized a trial policy and an adapted trial policy of a meta-learning model. In some implementations, the trial policy and the adapted trial policy are decoupled and separately optimized.

At block 804, the system selects a robot training task from a plurality of robot training tasks.

At block 806, the system updates the trial policy, using imitation learning, based on one or more human guided demonstrations for the selected task.

At block 808, the system determines whether to perform any additional imitation learning using any additional robot training tasks. If so, the system proceeds back to block 804, selects an additional training task from the plurality of robot training tasks and proceeds back to blocks 806 and 808 based on the additional training task. If not, the system proceeds to block 810.

At block 810, the system freezes the trial policy. In some implementations, freezing the trial policy prevents the system from having to continuously generate trials. This is in contrast to process 500 of FIG. 5 and process 600 of FIG. 6, where the trial policy and adapted trial policy share weights. Accordingly, in process 500 and process 600 trials are continuously generated as the trial policy is updated based on the generated trials.

At block 812, the system selects a human guided demonstration of the robot performing the task. In some implementations, the selected human guided demonstration is used as one of the one or more demonstrations used to update the trial policy at block 806. In some other implementations, the selected human guided demonstration is not used to update the trial policy at block 806.

At block 814, the system generates a trial of the robot performing the task based on the trial policy.

At block 816, the system stores the human guided demonstration and the generated trial as the next demonstration-trial pair in a buffer.

At block 818, the system determines whether to generate any additional trials. If so, the system proceeds back to block 812, selects another human guided demonstration, and proceeds to block 814 and 816 based on the additional demonstration. If the system determines to not generate any additional trials, the system proceeds to block 820. For example, the system can generate additional trials until the system generates a trial where the robot successfully completes the task. Additionally or alternatively, the system can generate trials until a threshold number of trials have been generated (e.g., two trials, three trials, 5 trials, 10 trials, etc.) and/or other condition(s) have been satisfied.

At block 820, the system updates the adapted trial policy, using reinforcement learning, based on the demonstration-trial pair(s) stored in the buffer.

Figure 9:
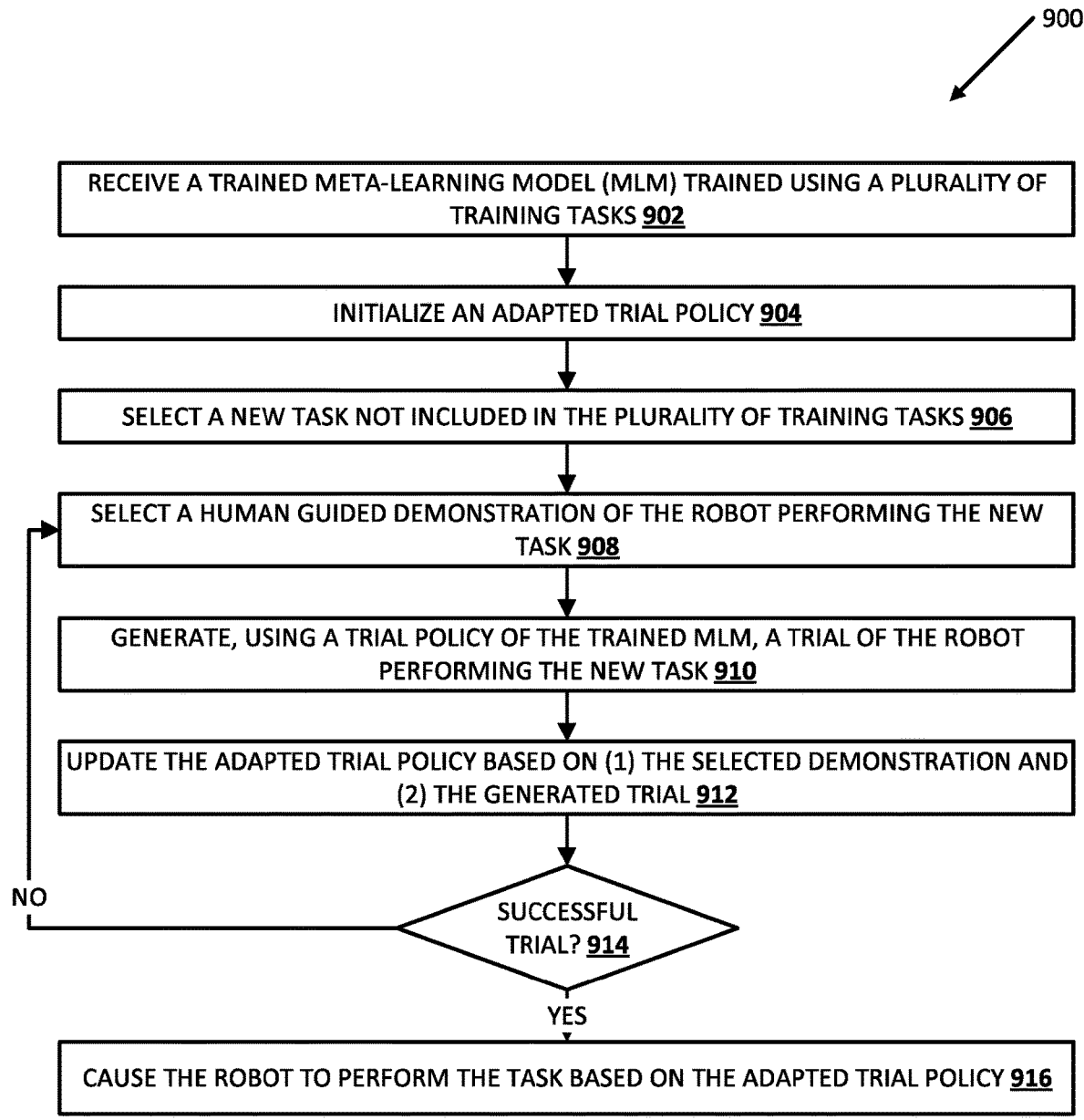
FIG. 9 is a flowchart illustrating another example process of training a trained meta-learning model for a new task in accordance with implementations disclosed herein.

FIG. 9 is a flowchart illustrating an example process 900 of training a trained meta-learning model to perform a new task in accordance with implementations disclosed herein. For convenience, the operations of the flowchart are described with reference to a system that performs the operations. This system may include one or more components of a robot and/or a computing device, such as a processor(s) of a robot and/or computing device and/or robot control system of robot 100, 1025, and/or other robot(s). Moreover, while operations of process 900 are shown in a particular order, this is not meant to be limiting. One or more operations may be reordered, omitted, and/or added.

At block 902, the system receives a trained meta-learning model, where the meta-learning model is trained using a plurality of training tasks. In some implementations, the trained meta-learning model is trained in accordance with process 800 of FIG. 8.

At block 904, the system initializes an adapted trial policy.

At block 906, the system selects a new task, where the new task is one that is not included in the plurality of training tasks used in training the trained meta-learning model.

At block 908, the system selects a human guided demonstration of the robot performing the new task.

At block 910, the system generates, using a trial policy of the trained meta-learning model, a trial of the robot performing the new task.

At block 912, the system updates the adapted trial policy based on (1) the selected demonstration and (2) the generated trail.

At block 914, the system determines whether the robot successfully completed the task in the generated trial. If so, the system proceeds to block 916. If not, the system proceeds back to block 908, selects an additional human guided demonstration, and proceeds to blocks 910, 912, and 914 using the additional human guided demonstration. In other words, the system generates another demonstration-trial pair. In some implementations, a human observer provides an indication of whether the robot successfully completed the task in the trial.

At block 916, the system causes the robot to perform the task based on the adapted policy network.

Figure 10:
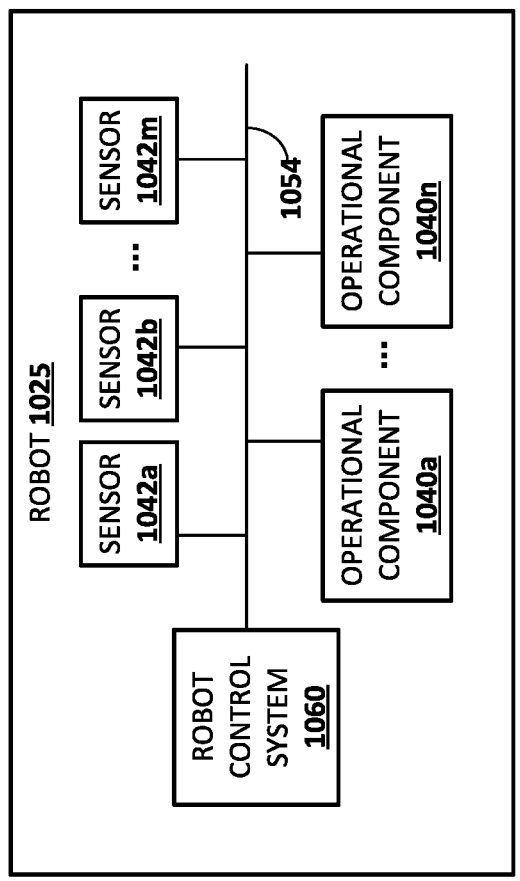
FIG. 10 schematically depicts an example architecture of a robot.

FIG. 10 schematically depicts an example architecture of a robot 1025. The robot 1025 includes a robot control system 1060, one or more operational components 1040a-1040n, and one or more sensors 1042a-1042m. The sensors 1042a-1042m may include, for example, vision components, light sensors, pressure sensors, pressure wave sensors (e.g., microphones), proximity sensors, accelerometers, gyroscopes, thermometers, barometers, and so forth. While sensors 1042a-m are depicted as being integral with robot 1025, this is not meant to be limiting. In some implementations, sensors 1042a-m may be located external to robot 1025, e.g., as standalone units.

Operational components 1040a-1040n may include, for example, one or more end effectors and/or one or more servo motors or other actuators to effectuate movement of one or more components of the robot. For example, the robot 1025 may have multiple degrees of freedom and each of the actuators may control actuation of the robot 1025 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1060 may be implemented in one or more processors, such as a CPU, GPU, and/or other controller(s) of the robot 1025. In some implementations, the robot 1025 may comprise a "brain box" that may include all or aspects of the control system 1060. For example, the brain box may provide real time bursts of data to the operational components 1040a-n, with each of the real time bursts comprising a set of one or more control commands that dictate, inter alia, the parameters of motion (if any) for each of one or more of the operational components 1040*a-n*. In some implementations, the robot control system 1060 may perform one or more aspects of processes 300, 400, 500, 600, 700, 800, 900, and/or other method(s) described herein.

As described herein, in some implementations all or aspects of the control commands generated by control system 1060 in positioning an end effector to grasp an object may be based on end effector commands generated using a meta-learning model. For example, a vision component of the sensors 1042*a-m* may capture environment state data. This environment state data may be processes, along with robot state data, using a policy network of the meta-learning model to generate the one or more end effector control commands for controlling the movement and/or grasping of an end effector of the robot. Although control system 1060 is illustrated in FIG. 10 as an integral part of the robot 1025, in some implementations, all or aspects of the control system 1060 may be implemented in a component that is separate from, but in communication with, robot 1025. For example, all or aspects of control system 1060 may be implemented on one or more computing devices that are in wired and/or wireless communication with the robot 1025, such as computing device 1110.

Figure 11:
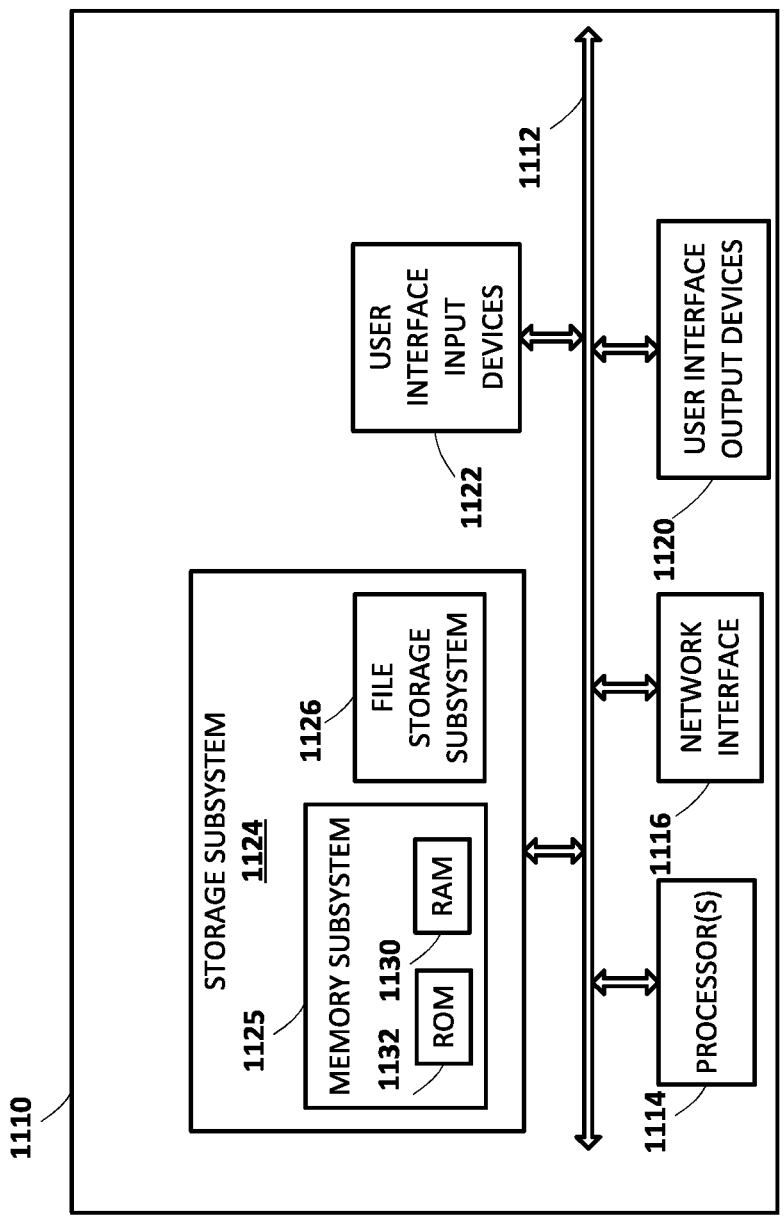
FIG. 11 schematically depicts an example architecture of a computer system.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the processes of FIGS. 3, 4, 5, 6, 7, 8, 9, and/or other methods described herein.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

In some implementations, a method implemented by one or more processors is provided that includes generating, based on a human guided demonstration of a robot performing a new task, an adapted policy network of a trained meta-learning model, for use in controlling the robot to perform the new task, wherein the meta-learning model is trained using a plurality of disparate tasks and is not trained on the new task. Generating the adapted policy network comprises further includes: generating an initial adaptation of the policy network based on the human guided demonstration and a trial policy network of the meta-learning model. The method further includes generating, using the initial adaptation of the policy network, an initial sequence of robot actions and corresponding states of the robot performing the new task. The method further includes causing the robot to perform the initial sequence of robot actions and corresponding robot states. The method further includes determining whether the initial sequence of robot actions and corresponding robot states successfully completes the new task. The method further includes generating the adapted policy network based on determining whether the initial sequence of robot actions and corresponding robot states successfully completes the new task.

These and other implementations of the technology disclosed herein can include one or more of the following features.

In some implementations, determining whether the initial sequence of robot actions and corresponding robot states successfully completes the new task includes determining the robot successfully completes the new task with the initial sequence of robot actions and corresponding robot states. In some implementations, generating the adapted policy network based on determining whether the initial sequence of robot actions and corresponding robot states successfully completes the new task includes generating the adapted policy network based on the initial adaptation of the policy network.

In some implementations, determining whether the initial sequence of robot actions and corresponding robot states successfully completes the new task includes determining the robot does not successfully complete the new task with the initial sequence of robot actions and corresponding robot states. In some of those implementations, generating the adapted policy network based on determining whether the initial sequence of robot actions and corresponding robot states successfully completes the new task includes generating a further adaption of the adapted policy network based on (1) the human guided demonstration, (2) the initial sequence of robot actions and corresponding robot states, and (3) the trial policy network of the meta-learning model. In some implementations, the method further includes generating, using the further adaption of the adapted policy network, a further sequence of robot actions and corresponding robot states of the robot of the robot performing the new task. In some implementations, the method further includes causing the robot to perform the further sequence of robot actions and corresponding robot states. In some versions of those implementations, the method further includes determining whether the further sequence of robot actions and corresponding robot states successfully completes the new task. In some implementations, the method further includes updating the adapted policy network based on determining whether the additional sequence of robot actions and corresponding robot states successfully completes the new task.

In some implementations, prior to generating the initial adaptation of the policy network based on the human guided demonstration of the set of trial parameters of the meta-learning model, the method further includes storing the human guided demonstration as an initial item in a buffer. In some implementations, in response to determining the robot does not successfully complete the new task with the initial sequence of robot actions and corresponding robot states, the method further includes storing the initial sequence of robot actions and corresponding robot states as the next item in the buffer. In some implementations, generating the further adaption of the adapted policy network based on (1) the human guided demonstration, (2) the initial sequence of robot actions and corresponding robot states, and (3) the trial policy network of the meta-learning model includes generating the further adaptation of the adapted policy network based on the contents of the buffer and the set of trial parameters of the meta learning model.

In some implementations, training the meta-learning model using the plurality of disparate tasks includes initializing the trial policy of the meta-learning model. In some implementations, the method further includes selecting a training task from the plurality of training tasks. In some implementations, the method further includes determining a human guided training demonstration of the robot performing the training task. In some implementations, the method further includes generating one or more training sequences of robot actions and corresponding robot states of the robot performing the training task based on the trial policy network and the human guided training demonstration. In some implementations, the method further includes determining an additional human guided training demonstration of the robot performing the training task. In some implementations, the method further includes updating, using meta-imitation learning, the trial policy network of the meta-learning model based on the additional human guided demonstration and the one or more training sequences.

In some implementations, generating one or more training sequences of robot actions and corresponding robot states of the robot performing the training task based on the trial policy network and the human guided training demonstration includes generating an initial training adaptation of the policy network based on the human guided training demonstration and the trial policy network. In some implementations, the method further includes generating, using the initial training adaptation of the policy network, an initial training sequence of robot actions and corresponding robot states of the robot performing the training task. In some implementations, the method further includes updating, using meta-reinforcement learning, a training adapted policy network based on (1) the human guided training demonstration, (2) the initial training sequence, and (3) the initial training adaptation of the policy network.

In some implementations, generating one or more training sequences, of robot actions and corresponding robot states, of the robot performing the training task based on the trial policy network and the human guided training demonstration further includes generating, using the training adapted policy network, a further training sequence of robot actions and corresponding robot states of the robot performing the training task. In some implementations, the method further includes updating, using reinforcement learning, the training adapted policy network based on (1) the human guided training demonstration, (2) the initial training sequence, (3) the further training sequence, and (4) the training adapted policy network.

In some implementations, training the meta-learning model using the plurality of disparate tasks includes initializing the trial policy network of the meta-learning model and the adapted trial policy network. In some implementations, the method further includes selecting a training task from the plurality of training tasks. In some implementations, the method further includes determining a human guided training demonstration of the robot performing the training task. In some implementations, the method further includes updating, using imitation learning, the trial policy network based on the human guided demonstration. In some implementations, the method further includes freezing the trial policy network of the meta-learning model. In some implementations, the method further includes generating one or more training sequences of robot actions and corresponding robot states of the robot performing the training task based on the frozen trial policy network and the human guided training demonstration. In some implementations, the method further includes updating, using reinforcement learning, the adapted trial policy network based on (1) the one or more training sequences of robot actions and corresponding robot states and (2) the human guided training demonstration.

In some implementations, generating the one or more training sequences of robot actions and corresponding robot states of the robot performing the training task based on the frozen trial policy network and the human guided training demonstration includes generating an initial training sequence of robot actions and corresponding robot states of the robot performing the task based on the trial policy network and the human guided training demonstration. In some implementations, the method further includes storing the human guided training demonstration and the generated initial training sequence as a first demonstration-trial pair in a training buffer. In some implementations, the method further includes determining whether the initial training sequence of robot actions and corresponding robot states successfully completes the training task.

In some implementations, generating the one or more training sequences of robot actions and corresponding robot states of the robot performing the training task based on the frozen trial policy network and the human guided training demonstration further includes, in response to determining the initial training sequence of robot actions and corresponding robot states does not successfully complete the training task, generating a further training sequence of robot actions and corresponding robot states of the robot performing the task based on the trial policy network and the human guided training demonstration. In some implementations, the method further includes storing the human guided training demonstration and the generated further training sequence as the next demonstration-trial pair in the training buffer.

In some implementations, using reinforcement learning, the adapted trial policy network based on (1) the one or more training sequences of robot actions and corresponding robot states and (2) the human guided training demonstration includes, for each demonstration-trial pair in the training buffer, determining a reward signal based on whether the robot successfully completes the training task in the corresponding demonstration-trial pair. In some implementations, the method further includes updating, using reinforcement learning, the adapted trial policy network based on demonstration-trial pair in the training buffer and the corresponding reward signal.

In some implementations, the new task is represented by a finite horizon Markov decision process.

In some implementations, the trial policy network is learned via Q-learning functions.

In some implementations, the adapted trial policy network is learned via Q-learning functions.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    generating, based on a human guided demonstration of a robot performing a new task, an adapted policy network of a trained meta-learning model, for use in controlling the robot to perform the new task, wherein the meta-learning model is trained using a plurality of disparate tasks and is not trained on the new task, and wherein generating the adapted policy network comprises:
        generating an initial adaptation of the adapted policy network based on the human guided demonstration and a trial policy network of the trained meta-learning model;
        generating, using the initial adaptation of the adapted policy network, an initial sequence of robot actions and corresponding robot states of the robot performing the new task;
        causing the robot to perform the initial sequence of robot actions and corresponding robot states;
        determining whether the initial sequence of robot actions and corresponding robot states successfully completes the new task; and
        generating the adapted policy network based on determining whether the initial sequence of robot actions and corresponding robot states successfully completes the new task.

2. The method of claim 1, wherein determining whether the initial sequence of robot actions and corresponding robot states successfully completes the new task comprises:
    determining the robot successfully completes the new task with the initial sequence of robot actions and corresponding robot states, and
    wherein generating the adapted policy network based on determining whether the initial sequence of robot actions and corresponding robot states successfully completes the new task comprises:
        generating the adapted policy network based on the initial adaptation of the adapted policy network.

3. The method of claim 1, wherein determining whether the initial sequence of robot actions and corresponding robot states successfully completes the new task comprises:
    determining the robot does not successfully complete the new task with the initial sequence of robot actions and corresponding robot states, and
    wherein generating the adapted policy network based on determining whether the initial sequence of robot actions and corresponding robot states successfully completes the new task comprises:
        generating a further adaption of the adapted policy network based on (1) the human guided demonstration, (2) the initial sequence of robot actions and corresponding robot states, and (3) the trial policy network of the meta-learning model;
    generating, using the further adaption of the adapted policy network, a further sequence of robot actions and corresponding robot states of the robot of the robot performing the new task;
    causing the robot to perform the further sequence of robot actions and corresponding robot states;
    determining whether the further sequence of robot actions and corresponding robot states successfully completes the new task; and updating the adapted policy network based on determining whether the additional sequence of robot actions and corresponding robot states successfully completes the new task.

4. The method of claim 3, further comprising:
prior to generating the initial adaptation of the adapted policy network based on the human guided demonstration of the set of trial parameters of the meta-learning model, storing the human guided demonstration as an initial item in a buffer;
in response to determining the robot does not successfully complete the new task with the initial sequence of robot actions and corresponding robot states, storing the initial sequence of robot actions and corresponding robot states as the next item in the buffer; and
wherein generating the further adaption of the adapted policy network based on (1) the human guided demonstration, (2) the initial sequence of robot actions and corresponding robot states, and (3) the trial policy network of the meta-learning model comprises:
generating the further adaptation of the adapted policy network based on the contents of the buffer and the set of trial parameters of the meta learning model.

5. The method of claim 3, wherein training the meta-learning model using the plurality of disparate tasks comprises:
initializing the trial policy of the meta-learning model;
selecting a training task from the plurality of training tasks;
determining a human guided training demonstration of the robot performing the training task;
generating one or more training sequences of robot actions and corresponding robot states of the robot performing the training task based on the trial policy network and the human guided training demonstration;
determining an additional human guided training demonstration of the robot performing the training task; and
updating, using meta-imitation learning, the trial policy network of the meta-learning model based on the additional human guided demonstration and the one or more training sequences.

6. The method of claim 5, wherein generating one or more training sequences of robot actions and corresponding robot states of the robot performing the training task based on the trial policy network and the human guided training demonstration comprises:
generating an initial training adaptation of the policy network based on the human guided training demonstration and the trial policy network;
generating, using the initial training adaptation of the policy network, an initial training sequence of robot actions and corresponding robot states of the robot performing the training task; and
updating, using meta-reinforcement learning, a training adapted policy network based on (1) the human guided training demonstration, (2) the initial training sequence, and (3) the initial training adaptation of the policy network.

7. The method of claim 6, wherein generating one or more training sequences, of robot actions and corresponding robot states, of the robot performing the training task based on the trial policy network and the human guided training demonstration further comprises:
generating, using the training adapted policy network, a further training sequence of robot actions and corresponding robot states of the robot performing the training task; and
updating, using reinforcement learning, the training adapted policy network based on (1) the human guided training demonstration, (2) the initial training sequence, (3) the further training sequence, and (4) the training adapted policy network.

8. The method of claim 3, wherein training the meta-learning model using the plurality of disparate tasks comprises:
initializing the trial policy network of the meta-learning model and the adapted trial policy network;
selecting a training task from the plurality of training tasks;
determining a human guided training demonstration of the robot performing the training task;
updating, using imitation learning, the trial policy network based on the human guided demonstration;
freezing the trial policy network of the meta-learning model;
generating one or more training sequences of robot actions and corresponding robot states of the robot performing the training task based on the frozen trial policy network and the human guided training demonstration; and
updating, using reinforcement learning, the adapted trial policy network based on (1) the one or more training sequences of robot actions and corresponding robot states and (2) the human guided training demonstration.

9. The method of claim 8, wherein generating the one or more training sequences of robot actions and corresponding robot states of the robot performing the training task based on the frozen trial policy network and the human guided training demonstration comprises:
generating an initial training sequence of robot actions and corresponding robot states of the robot performing the task based on the trial policy network and the human guided training demonstration;
storing the human guided training demonstration and the generated initial training sequence as a first demonstration-trial pair in a training buffer; and
determining whether the initial training sequence of robot actions and corresponding robot states successfully completes the training task.

10. The method of claim 9, wherein generating the one or more training sequences of robot actions and corresponding robot states of the robot performing the training task based on the frozen trial policy network and the human guided training demonstration further comprises:
in response to determining the initial training sequence of robot actions and corresponding robot states does not successfully complete the training task,
generating a further training sequence of robot actions and corresponding robot states of the robot performing the task based on the trial policy network and the human guided training demonstration; and
storing the human guided training demonstration and the generated further training sequence as the next demonstration-trial pair in the training buffer.

11. The method of claim 10, wherein updating, using reinforcement learning, the adapted trial policy network based on (1) the one or more training sequences of robot actions and corresponding robot states and (2) the human guided training demonstration comprises:
for each demonstration-trial pair in the training buffer:
determining a reward signal based on whether the robot successfully completes the training task in the corresponding demonstration-trial pair; and updating, using reinforcement learning, the adapted trial policy network based on demonstration-trial pair in the training buffer and the corresponding reward signal.

12. The method of claim 1, wherein the new task is represented by a finite horizon Markov decision process.

13. The method of claim 1, wherein the trial policy network is learned via Q-learning functions.

14. The method of claim 1, wherein the adapted trial policy network is learned via Q-learning functions.

* * * * *